(12) United States Patent
Tanemura et al.

(10) Patent No.: US 11,256,413 B2
(45) Date of Patent: Feb. 22, 2022

(54) NON-CONTACT GESTURE COMMANDS FOR TOUCH SCREENS

(71) Applicant: SYNAPTICS INCORPORATED, San Jose, CA (US)

(72) Inventors: Tetsuo Tanemura, Tokyo (JP); Xueyong Yang, Tokyo (JP); Atsushi Shikata, Tokyo (JP); Takashi Imai, Tokyo (JP); Atsushi Maruyama, Tokyo (JP)

(73) Assignee: Synaptics Incorporated, San Jose, CA (US)

( * ) Notice: Subject to any disclaimer, the term of this patent is extended or adjusted under 35 U.S.C. 154(b) by 82 days.

(21) Appl. No.: 16/786,486

(22) Filed: Feb. 10, 2020

(65) Prior Publication Data

US 2021/0247896 A1    Aug. 12, 2021

(51) Int. Cl.
*G06F 3/0488* (2013.01)
*G06F 3/0481* (2013.01)
*G06F 3/044* (2006.01)
*G06F 3/0346* (2013.01)
*G06F 3/01* (2006.01)
*G06F 3/04883* (2022.01)
*G06F 3/04815* (2022.01)

(52) U.S. Cl.
CPC .......... *G06F 3/04883* (2013.01); *G06F 3/044* (2013.01); *G06F 3/04815* (2013.01); *G06F 3/017* (2013.01); *G06F 3/0346* (2013.01); *G06F 3/0488* (2013.01); *G06F 2203/04108* (2013.01)

(58) Field of Classification Search
CPC .. G06F 3/04883; G06F 3/044; G06F 3/04815; G06F 3/017; G06F 3/0346; G06F 3/005; G06F 3/048
USPC ......................................................... 345/174
See application file for complete search history.

(56) References Cited

U.S. PATENT DOCUMENTS

| 9,205,846 B2 | 12/2015 | Cartarius et al. | |
| 2012/0017147 A1 | 1/2012 | Mark | |
| 2012/0223935 A1 | 9/2012 | Renwick | |
| 2012/0262398 A1 | 10/2012 | Kim et al. | |
| 2013/0113721 A1* | 5/2013 | Lee | G06F 3/0446 345/173 |
| 2014/0267025 A1* | 9/2014 | Kim | G06F 3/04166 345/156 |
| 2014/0292818 A1* | 10/2014 | Kim | G06F 3/0482 345/681 |
| 2016/0124513 A1* | 5/2016 | Dal Zot | G06K 9/00355 715/863 |
| 2016/0202873 A1 | 7/2016 | Chi et al. | |
| 2018/0130283 A1* | 5/2018 | Froy | G07F 17/3262 |

(Continued)

OTHER PUBLICATIONS

International Search Report, dated May 25, 2021, in International Patent Application No. PCT/US2021/017187.

(Continued)

*Primary Examiner* — Jimmy H Nguyen
(74) *Attorney, Agent, or Firm* — Leydig, Voit & Mayer, Ltd.

(57) ABSTRACT

A method for displaying aerial images includes detecting a capacitive response of a non-contact gesture made by a user proximate to a touch sensing enabled display screen, and in response to detecting the non-contact gesture, displaying one or more images in a three-dimensional (3D) space proximate to the display screen.

16 Claims, 14 Drawing Sheets

(56) References Cited

U.S. PATENT DOCUMENTS

2018/0335939 A1* 11/2018 Karunamuni ............. G06F 8/38
2019/0102946 A1* 4/2019 Spivack .................. G06F 3/017
2019/0285904 A1 9/2019 Kim et al.

OTHER PUBLICATIONS

Written Opinion, dated May 25, 2021, in International Patent Application No. PCT/US2021/017187.

* cited by examiner

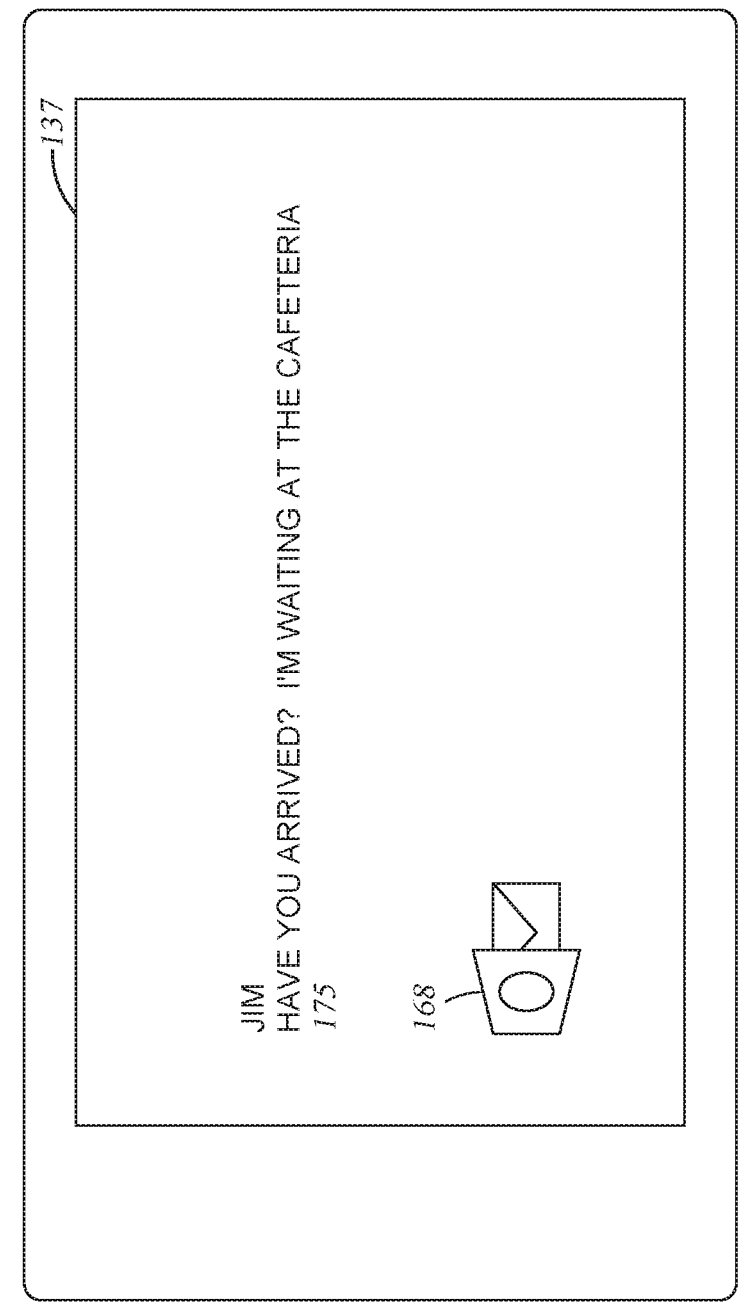

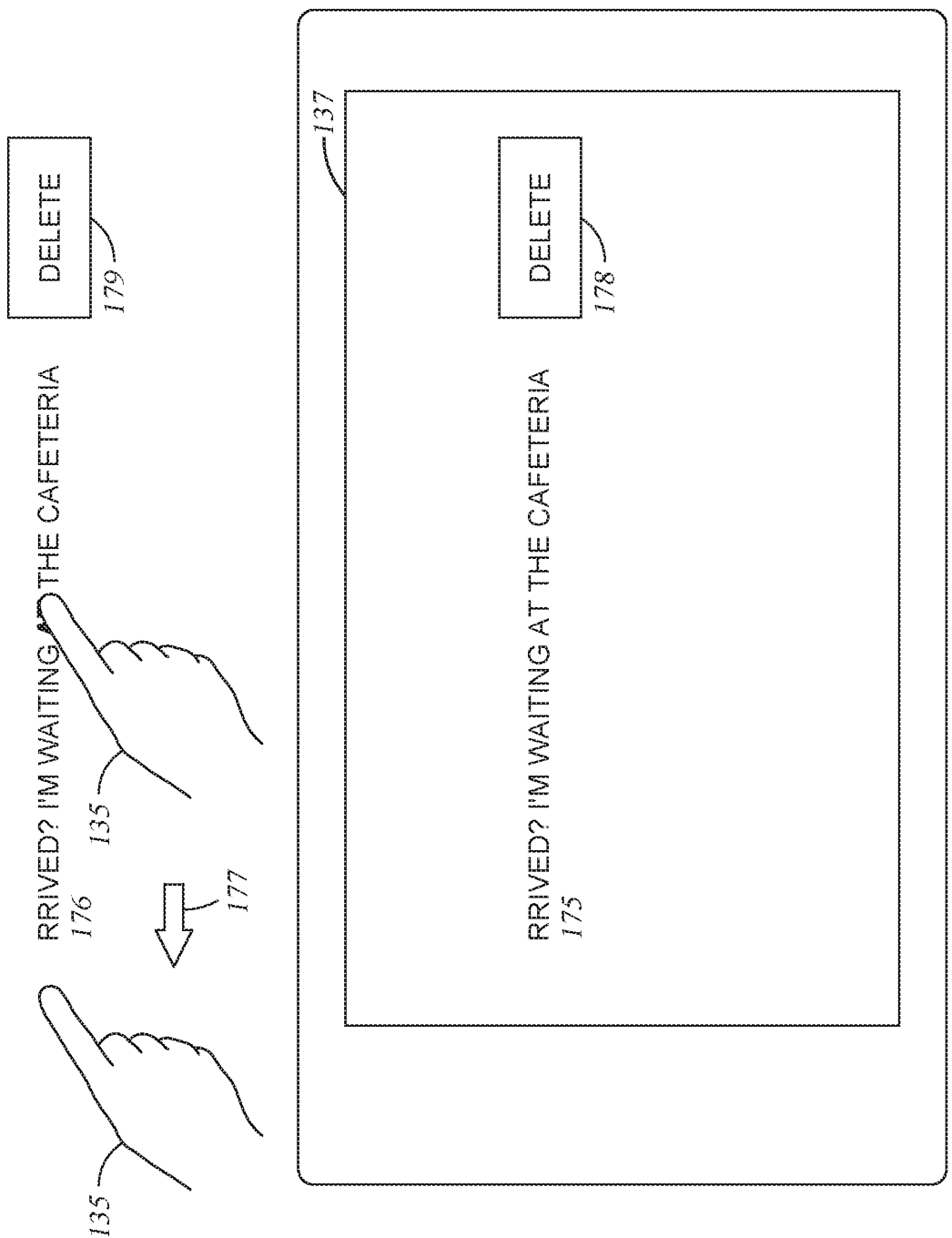

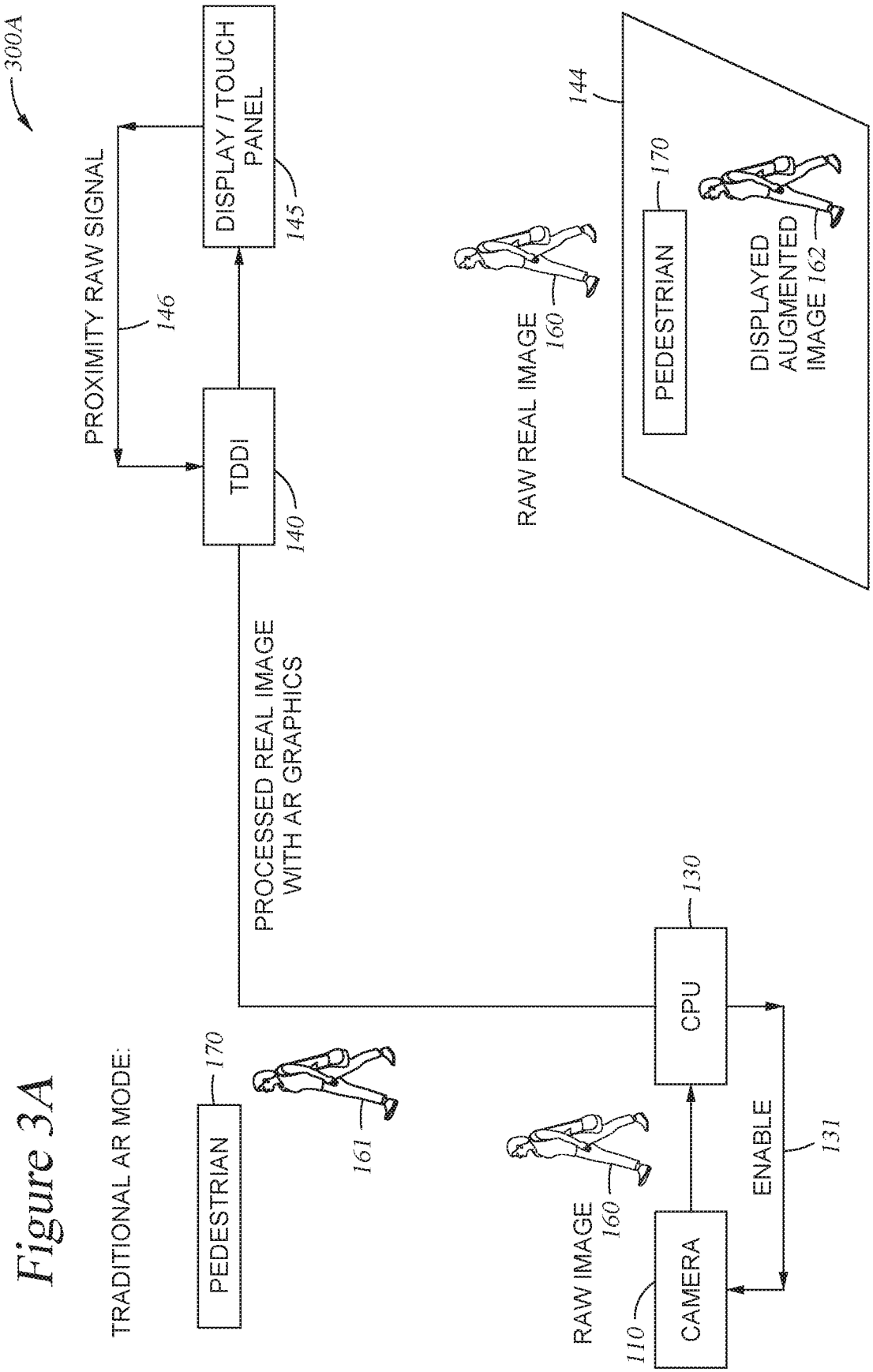

3D AR MODE:

NON-AR (NORMAL) MODE:

NON-CONTACT GESTURE COMMANDS FOR TOUCH SCREENS

TECHNICAL FIELD

Embodiments of the present disclosure generally relate to touch screen equipped display devices, and in particular to detection of non-contact hand gestures made above such devices for controlling aerial display of images in a 3D space above such devices.

BACKGROUND

In a traditional AR mode, a display device, such as, for example, an in-vehicle display, a smartphone, a tablet, a laptop, or the like, equipped with both touchscreen and display functionality, projects both a real image and user interface (UI) graphics on a 2D display screen. The real image may be, for example, acquired by a camera, and the UI graphics supplied by an AR application. In such a traditional AR mode, in order to view the combined (augmented) image, a user must stare directly at the 2D display to see the AR objects as displayed together with the real image. If the input device is provided in an automobile, in order to see both the road and also to interact with the display screen, the user must frequently move his or her line of sight between the 2D display of the input device and the 3D view of the real world which is seen through the windshield and mirrors of the vehicle.

Moreover, there are other contexts in which a user of a display device (equipped with touchscreen functionality) wishes to use an AR application, but cannot physically touch the display screen. For example, there may be a cooking application that teaches techniques by adding AR icons, graphics and messages to real world images of ingredients, such as, for example adding a "cut here" arrow to an image of an onion, or showing a preferred consistency of a sauce next to an actual saucepan. Users of that application desire to interact with it while cooking, but often have hands that are too dirty to touch the screen. Additionally, such users do not want to have to look at the display either, as it is inconvenient to both cook and look at a display screen.

A display device that solves these problems of traditional AR is desired.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

In one embodiment, a method for displaying aerial images is disclosed. The method includes detecting a capacitive response of a non-contact gesture made by a user proximate to a touch sensing enabled display screen, and in response to detecting the non-contact gesture, displaying one or more images in a three-dimensional (3D) space proximate to the display screen.

In another embodiment, a system for aerial display of images is also disclosed. The system includes a display screen including 3D imaging equipment, and a touch screen sensing system, configured to respectively obtain a set of capacitive responses for a corresponding set of non-contact gestures made by a user proximate to the display screen. The system further includes a processor, coupled to each of the display screen and the touch screen sensing system, configured to, in response to each identified non-contact gesture, control the 3D imaging equipment to, in an aerial display mode, display one or more images in a 3D space proximate to the display screen.

'In yet another embodiment, a method of interactively displaying images in a 3D space proximate to a display device is disclosed. The method includes displaying an image at a pre-defined home position in a 3D space proximate to a display device, determining, by analyzing a capacitive response on the display device, if a first interactive non-contact gesture has been performed on the image at the home position by a user, and in response to a determination that the first interactive gesture has been performed on the image by the user, displaying at least a portion of the image as moving to a second position in the 3D space and then returning to the home position after a pre-defined time. The method further includes determining, by analyzing a capacitive response on the display device, if a second interactive non-contact gesture has been performed on the image at the home position by a user, and in response to the determination that the second interactive non-contact gesture has been performed by the user, displaying at least a portion of the image as moving to a third position in the 3D space and returning to the home position after a pre-defined time.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only some embodiments of this disclosure and are therefore not to be considered limiting of its scope, for the disclosure may admit to other equally effective embodiments.

FIG. 2C illustrates the user, after having selected an email icon, seeing an email projected in the 3D space above the example touch screen, according to one or more embodiments.

FIG. 2D illustrates the user, having read the email displayed as shown in FIG. 2C, swiping in the air to delete it (after selecting a "Delete" icon) using a Delete icon displayed in the air, according to one or more embodiments.

FIG. 3A illustrates an example system operating in a traditional AR mode.

Figure 1:
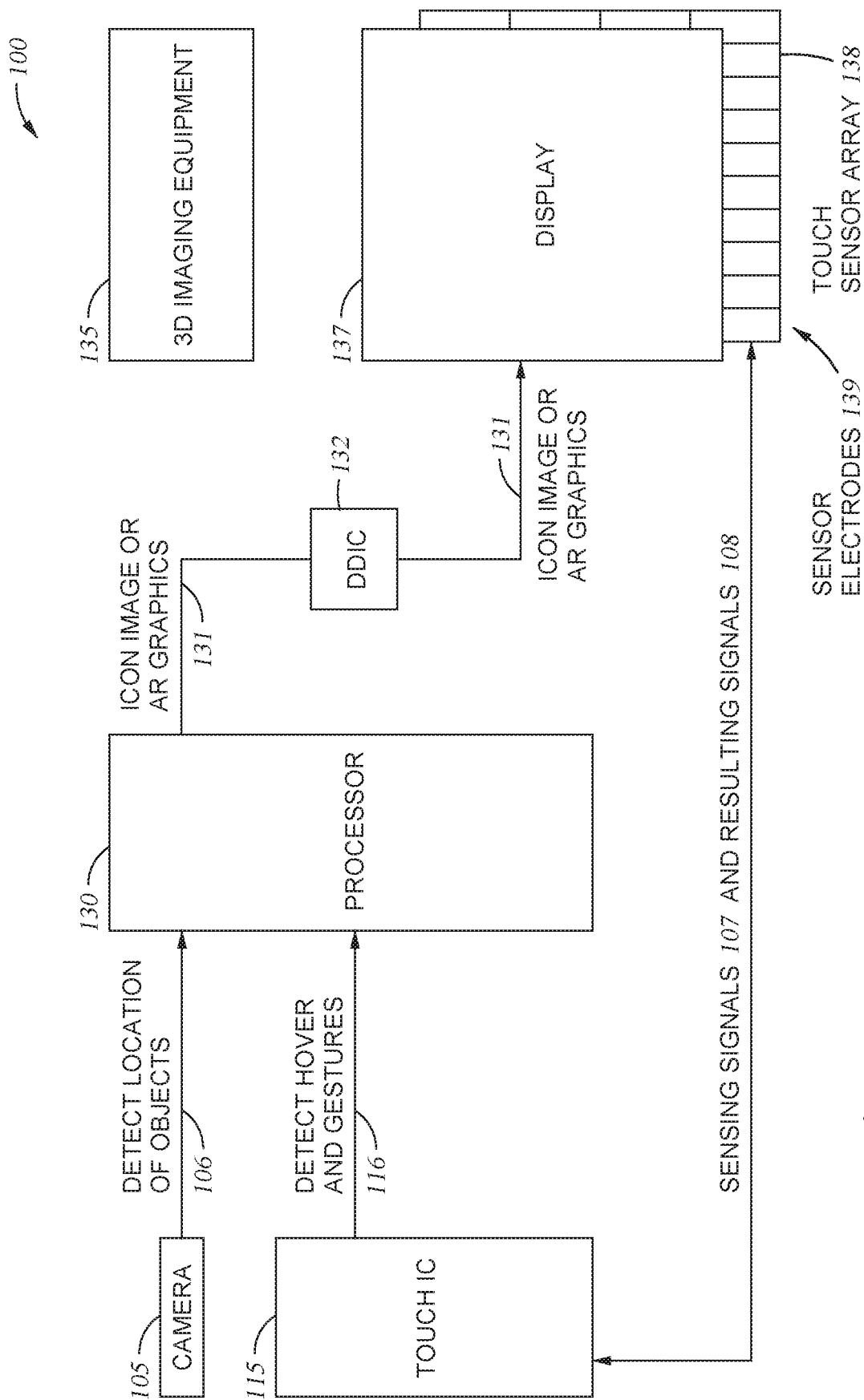
FIG. 1 is an example system diagram, according to one or more embodiments.

To facilitate understanding, identical reference numerals have been used, where possible, to designate identical elements that are common to the Figures. It is contemplated that elements disclosed in one embodiment may be beneficially utilized on other embodiments without specific recitation. The drawings should not be understood as being drawn to scale unless specifically noted. Also, the drawings may be simplified and details or components omitted for clarity of presentation and explanation. The drawings and discussion serve to explain principles discussed below, where like designations denote like elements.

DETAILED DESCRIPTION

In one or more embodiments, non-contact hand gestures performed by users in a 3D space above a touch screen of a combined display and touch sensing device may be used to control the aerial display of images in the 3D space. In one or more embodiments, the gestures may be used to turn on or off aerial image display functionality for both AR applications as well as for other use scenarios where direct or precise hand interaction with the touch screen is inconvenient, not desired or not possible. In some embodiments, the non-contact hand gestures may be used to turn on and off a mechanical or optical aerial display projection switch on the device without requiring a user to make any hand contact or even glance at the device with their eyes.

The following description may use perspective-based descriptions such as top/bottom, in/out, over/under, and the like. Such descriptions are merely used to facilitate the discussion and are not intended to restrict the application of embodiments described herein to any particular orientation.

The following description may use the phrases "in one embodiment," or "in one or more embodiments," or "in some embodiments", which may each refer to one or more of the same or different embodiments. Furthermore, the terms "comprising," "including," "having," and the like, as used with respect to embodiments of the present disclosure, are synonymous.

The terms "coupled with," along with its derivatives, and "connected to" along with its derivatives, may be used herein, including in the claims. "Coupled" or "connected" may mean one or more of the following. "Coupled" or "connected" may mean that two or more elements are in direct physical or electrical contact. However, "coupled" or "connected" may also mean that two or more elements indirectly contact each other, but yet still cooperate or interact with each other, and may mean that one or more other elements are coupled or connected between the elements that are said to be coupled with or connected to each other. The term "directly coupled" or "directly connected" may mean that two or elements are in direct contact.

As used herein, including in the claims, the term "circuitry" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

As used herein, including in the claims, a "display device" may refer to a user device that has both display and touch screen functionality. As used herein, including in the claims, the term "display/touch panel" refers to the actual upper surface of a display device, on which the images are displayed, and over which a user may hover, and perform non-contact gestures. This panel may sometimes also be referred to herein as a "display screen", or, when the focus of the discussion is on the touch sensing aspect of the display/touch panel, it may be referred to as a "touch screen."

As used herein, including in the claims, the term "aerial display" refers to projecting 2D images into a space proximate to a display device such that a user may visualize the images without looking at a display screen of the display device. For example, the aerial display of images by the display device may be in front of, above, to any side of, and even behind, the display device. An "aerial display mode", or as sometimes used in contexts where the 3D aspect is being emphasized, a "3D aerial display mode", of a display device refers to an operational mode of the display device in which aerial display occurs. It is contemplated by the present disclosure that a user of a display device may turn on and off an aerial display mode of the device in various ways, in particular, for example, without actually touching the display screen of the display device. In some examples, in aerial display mode AR images are projected into the 3D space above the display device so that the images appear adjacent to, or superimposed upon, real world objects in the 3D space that a user sees at some distance away from the display device. In other, non-AR based examples, user interface (UI) icons or images are projected into the 3D space above the display device so that the user may interact with the display device as he or she normally would, but without touching it.

FIG. 1 illustrates a schematic diagram of an example system 100, according to one or more embodiments. With reference to FIG. 1, system 100 may be implemented on a display device that is also equipped with touch screen functionality, such as, for example, a smartphone, laptop computer, desktop computer, public kiosk, or in-vehicle display screen, for example. System 100 includes camera 105, touch IC 115, processor 130, display driver IC (DDIC) 132, display 137 and 3D imaging equipment 135. In one or more embodiments, display 137 is configured to display images. The images may include real-time images acquired by camera 115, or they may be images stored within, or generated by, processor 130. Images stored or generated by processor 130 may include user interface (UI) icons and menus, application icons, AR graphics and the like. Additionally, via a data network or cellular network connection (not shown), display 137 may display images, including videos, received from an external source, such as photographs or video clips downloaded by a user, or received from another person or application and directed to the user.

Display 137 is also provided with touch sensing functionality, in the form of touch sensor array 138. Touch sensor array 138, together with touch IC 115, comprise a touch sensing sub-system of system 100. In one embodiment, touch sensor array 138 includes an array of sensor electrodes 139 to perform capacitive sensing. In some embodiments, the sensor electrodes 139 of touch sensor array 138 may include one or more common voltage electrodes. In some embodiments, the sensor electrodes 139 of touch sensing array 138 may be integrated with electrodes used to update display 137.

The sensor electrodes 139 of touch sensor array 138 may have any shape, size and/or orientation. For example, the sensor electrodes 139 may be arranged in a two-dimensional array, and each of the sensor electrodes 139 may be substantially rectangular in shape. In other embodiments, the sensor electrodes 139 may have other shapes. Further, each of the sensor electrodes 139 may have the same shape and/or size. In other embodiments, at least one sensor electrode may have a different shape and/or size than another sensor electrode. In various embodiments, the sensor electrodes may be diamond shaped, have interdigitated fingers to increase field coupling, and/or have floating cut-outs inside to reduce stray capacitance to nearby electrical conductors.

In one or more embodiments, some capacitive implementations of touch sensor array 138 may utilize "self-capacitance" (or "absolute capacitance") sensing methods based on changes in the capacitive coupling between sensor electrodes 139 and an input object. In various embodiments, an input object near the sensor electrodes 139, such as, for example, a finger, a fist, a palm, or a set of multiple fingers, alters the electric field near the sensor electrodes, thus changing the measured capacitive coupling. In one implementation, an absolute capacitance sensing method operates by modulating sensor electrodes 139 with respect to a reference voltage (e.g., system ground), and by detecting the capacitive coupling between the sensor electrodes 139 and input objects.

In one or more embodiments, some capacitive implementations of touch sensor array 138 may utilize "mutual capacitance" or "transcapacitance" sensing methods based on changes in the capacitive coupling between the sensor electrodes 139 themselves. In various embodiments, an input object near the sensor electrodes 139 alters the electric field between the sensor electrodes 139, thus changing the measured capacitive coupling. In one implementation, a transcapacitive sensing method operates by driving some of sensor electrodes 139 with a sensing signal 107, and capturing a received version of that signal (a "resulting signal" 108), as modified by an input object, on others of sensor electrodes 139. Thus, in such an example implementation, the method detects the capacitive coupling between one or more transmitter sensor electrodes (also "transmitter electrodes" or "transmitters") and one or more receiver sensor electrodes (also "receiver electrodes" or "receivers"). Transmitter sensor electrodes may be modulated relative to a reference voltage (e.g., system ground) to transmit transmitter signals. Receiver sensor electrodes may be held substantially constant relative to the reference voltage, or modulated with reference to the transmitter sensor electrodes to facilitate receipt of resulting signals. A resulting signal 108 may comprise effect(s) corresponding to one or more transmitter signals, and/or to one or more sources of environmental interference (e.g. other electromagnetic signals). In one or more embodiments, sensor electrodes 139 may be dedicated transmitters or receivers, or may be configured to both transmit and receive. In one or more embodiments, touch sensor array 138, together with touch IC 115, may use capacitive sensing to detect input objects that are in proximity to, e.g., above, but that are not touching, display 137.

Continuing with reference to FIG. 1, in one or more embodiments, touch IC 115 is configured to control touch sensing array 138 to perform capacitive sensing. In one embodiment, touch IC 115 comprises a driver module (not shown), which may include a signal generator. In one or more embodiments, the driver module generates sensing signals 107 with which to drive the electrodes of sensing array 138. In various embodiments, touch IC 115 comprises parts of, or all of, one or more integrated circuits (ICs) and/or other circuitry components.

In some embodiments, the touch IC 115 also comprises electronically-readable instructions, such as firmware code, software code, and/or the like. In some embodiments, components composing the touch IC 115 are located together, such as, for example, near touch sensor array 138. In other embodiments, components of touch IC 115 are physically separate with one or more components close to the touch sensor array 138, and one or more components elsewhere. For example, system 100 may be physically integrated in a phone or smartphone, and the touch IC 115 may comprise circuits and firmware that are part of a main processor of the phone. Further yet, the touch IC 115 may be implemented within an automobile, and the touch IC 115 may comprise circuits and firmware that are part of one or more of the electronic control units (ECUs) of the automobile.

In one or more embodiments, the touch IC 115 may be implemented as one or more modules that handle different functions of the touch IC 115 (e.g., a driver module, or a determination module). Each module may comprise circuitry that is a part of the touch IC 115, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

Figure 3B:
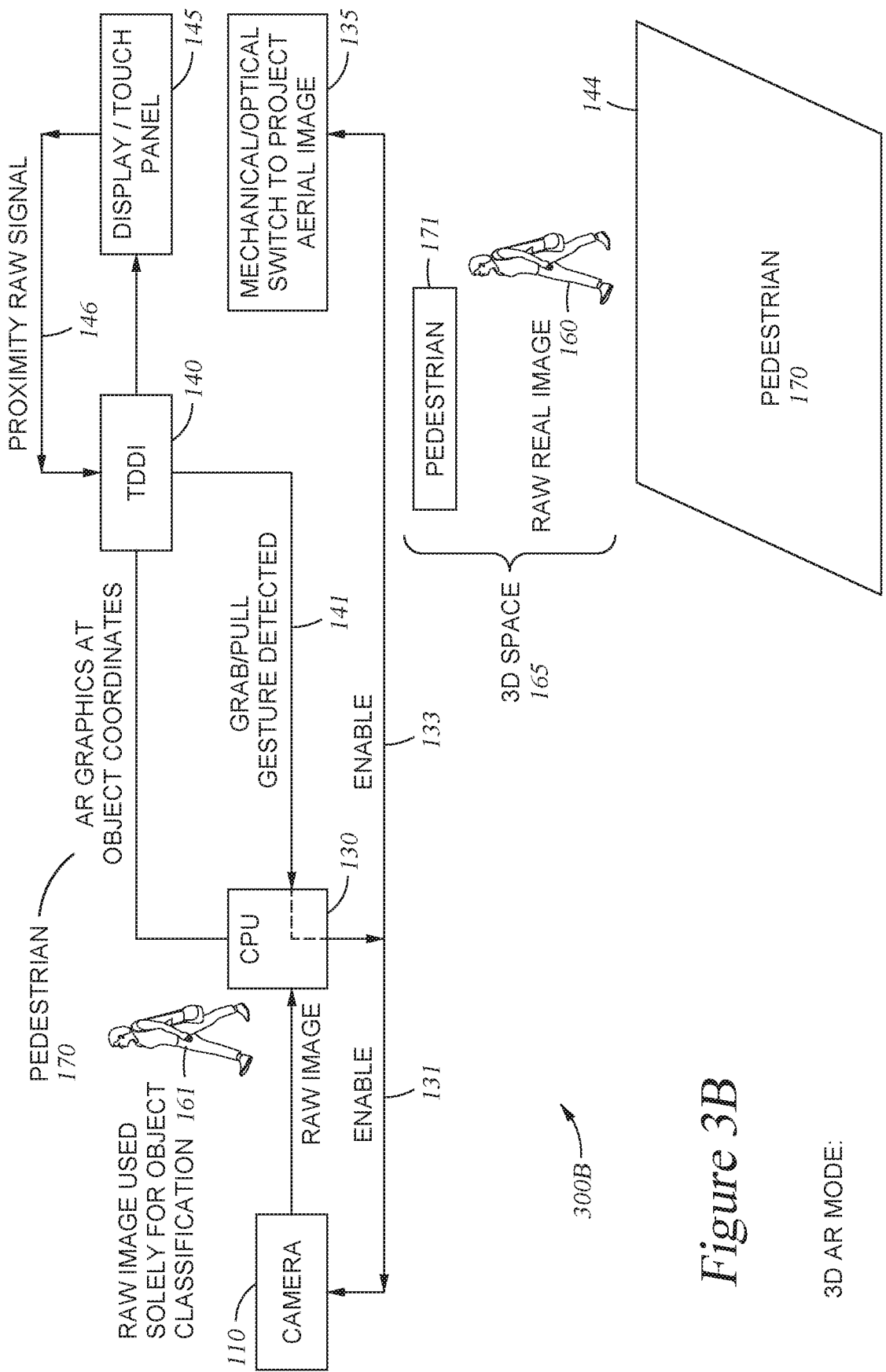
FIG. 3B illustrates an enhanced version of the example system of FIG. 3A operating in a 3D AR mode, according to one or more embodiments.
Figure 3C:
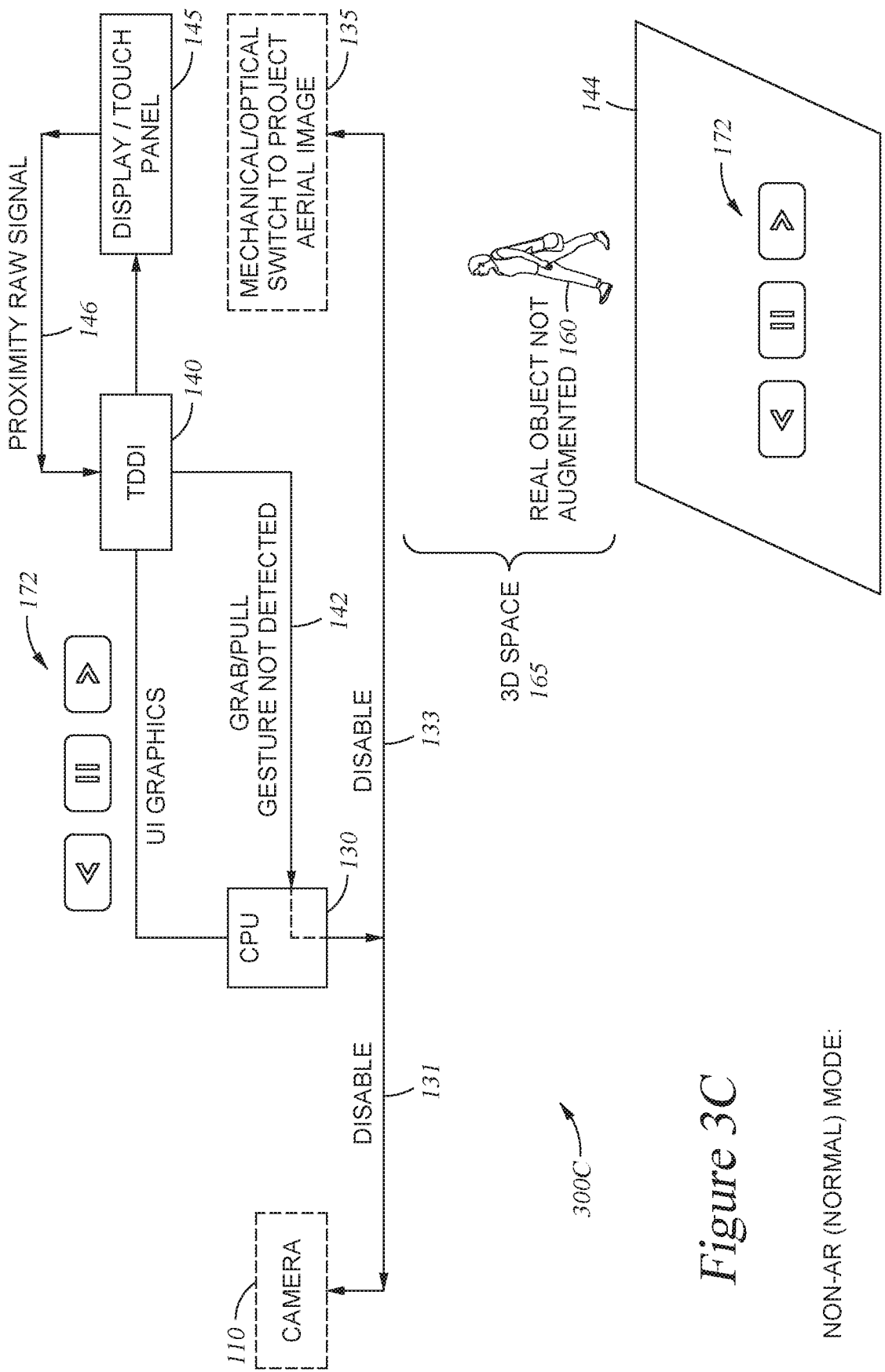
FIG. 3C illustrates the example system of FIG. 3B when the 3D AR mode is disabled, according to one or more embodiments.

In one or more embodiments, touch IC 115 may be combined with DDIC 132, and the combined circuitry of the touch IC 115 and the DDIC 132 may be configured for both display updating and input sensing, and may, for example, be referred to as including touch and display driver integration (TDDI) technology (not shown). In such embodiments, for example, the combined touch and display driver circuitry may be combined into a single IC, such as, for example, TDDI 140 as shown in FIGS. 3A through 3C, described below. In such TDDI embodiments, the combined touch IC 115 and DDIC 132 circuitry both updates display 137 and controls input sensing of touch sensor array 138.

In one or more embodiments, the ability of touch IC 115 to detect, via touch sensor array 138, capacitive responses of objects that hover over, but do not touch, display 137, may be leveraged to control an aerial display mode of system 100, and in particular, display 137, using 3D imaging equipment 135. As shown in FIG. 1, touch IC 115 may detect a hovering action of a user over an icon, for example. Touch IC 115 may then, over signal path 116, inform the processor 130 of this fact. Thus, in one or more embodiments, touch IC 115 (or in a TDDI embodiment, a touch portion of integrated TDDI circuitry) is responsible for acquiring a hover or aerial gesture response from sensor electrodes 139, abstracting it as gesture event, and reporting it to processor 130. In one or more embodiments, in response, processor 130 may provide, over signal line 131 via DDIC 132 (or, in TDDI embodiments, via the display driver portion of a combined touch and display IC) to display 137 an icon image to be displayed that the user may interact with.

Continuing with reference to FIG. 1, camera 105 is configured to detect the location of one or more real world objects in the vicinity of system 100, and report those locations to processor 130 over signal path 106. This functionality is used in an example aerial display mode of system 100. Thus, for example, in such an aerial display mode, processor 130 may generate AR graphics to augment the real world images of such objects, send them to display 137 (via DDIC 132, as noted above) to display them to a user in the 3D space above display 137, so that they are, or they appear to be, at the precise locations of the real-world objects. In this manner the user sees an augmented version of the real-world objects, enhanced by the AR graphics. Further details and examples of this functionality are described below, with reference to FIG. 3B, which illustrates such an example 3D AR mode of an example display device.

Figure 2A:
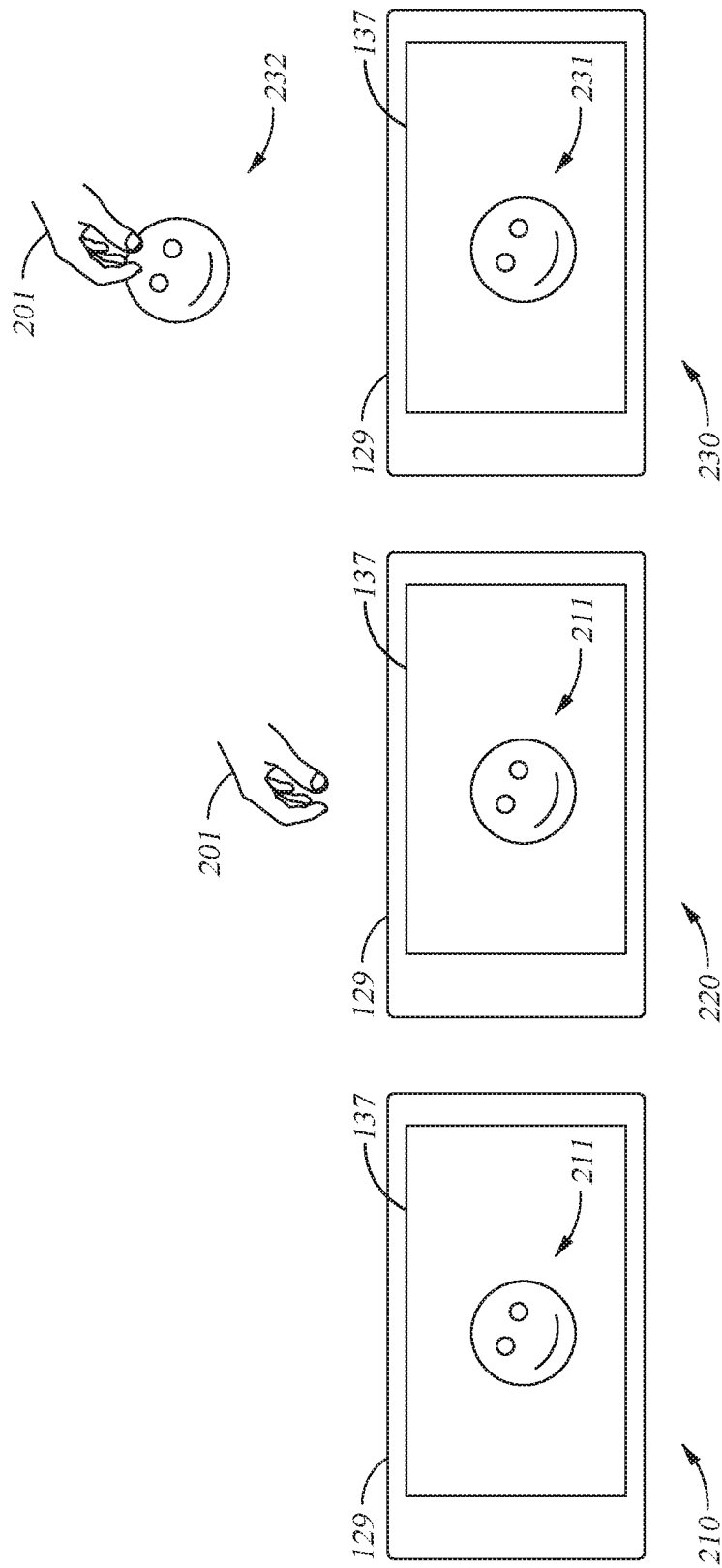
FIG. 2A illustrates example hand gestures sensed by a touch screen and display device triggering display of a "genie" helper icon in the 3D space above the device, according to one or more embodiments.

FIG. 2A next described, illustrates an example user interaction with an icon on a display device to enter an aerial display mode of the display device, according to one or more embodiments.

Thus, FIG. 2A illustrates example hand gestures sensed by a touch screen equipped display device triggering display of an example "genie" 232 icon in the 3D space above the device, according to one or more embodiments. In one or more embodiments, the example hand gestures are "non-contact" gestures, which means that the user does not need to touch the display device in any way in order to perform them. Non-contact hand gestures thus provide a user with a way to control a display device in contexts when he or she does not want to, or it would not be advisable for him or her to touch it, for various reasons. With reference to FIG. 2A, there are three panels shown, each of which represents a different point in a time sequence, beginning with the leftmost panel, panel 210, and ending with the rightmost panel, panel 230. Each panel of FIG. 2A illustrates an example display 137 of an example display device 129. In panel 210, at a first point in the sequence, a "genie" icon is displayed on display 137, which, in one embodiment, is used as a helper icon to guide a user in launching an aerial display mode of the device. In panel 210, as shown, there is no user interaction with the display 137.

Following the situation depicted in panel 210, in panel 220, at a later point in time, a user's hand 201 hovers over the display 137, and in particular over the genie icon 211, but does not touch either the display 137 or the display device 129. In response, a touch sensing system of the display device 129 detects the hovering user's hand 201. If the user then performs a first non-contact gesture, then, in response, as shown in panel 230, the system displays the genie icon 231 on display 137 as well as above it 232 in a preview mode of the aerial display mode. In one or more embodiments, the display of an icon 232 in preview mode prior to entering a full aerial display mode gives a user a chance to confirm that he or she wishes to select the full aerial display mode of the example display device. In one or more embodiments, entering aerial display mode can consume power, so it is useful to require the user to perform a two-stage process to enter it. In one or more embodiments, the preview aerial display mode may be entered if, after hovering over the display 137 as shown at panel 220, the user performs a first non-contact gesture. With reference to FIG. 2A, between the situations depicted in panels 220 and 230, the user has performed just such a first non-contact gesture (not shown).

Continuing with reference to FIG. 2A, following the user performing the non-contact gesture (as noted, the first non-contact gesture is not shown in FIG. 2A), as shown in panel 230, the genie or helper icon 231 is now displayed on display 137, and also projected into the 3D space above the display device 129 in a preview mode 232. In the preview mode the projected image of the genie icon 232 is seen at a first, relatively lower height above the display 137. At this point, in one or more embodiments, if the user wishes to enter the full aerial display mode, he or she is to perform a second non-contact gesture. This second non-contact gesture, as shown at panel 230 of FIG. 2A, may include grabbing the projection of genie icon 232 in the 3D space above the display device 129, as shown, and then pulling it upwards. As described below, this is known, in some embodiments, as a "pull" gesture. In one or more embodiments, following such a second non-contact gesture, e.g., the pull gesture, the display device enters the full aerial display mode. In the full aerial display mode (not shown in FIG. 2A) the icons, graphics or other images may be projected into the 3D space above the display device at a second, relatively higher height, where it is easier for the user to interact with them.

Following entry of the full display mode, a user may directly interact with UI graphics, and control various functions of the display device with only non-contact hand gestures. Such an example interaction is illustrated in FIGS. 2B through 2D, next described.

Figure 2B:
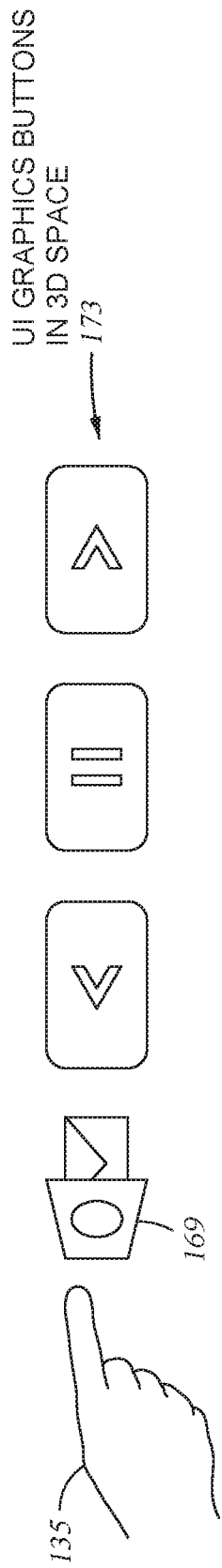
FIG. 2B illustrates a user seeing a set of example (UI) buttons displayed in the 3D space above an example touch screen and display device, and then selecting one of the interface buttons "in the air", according to one or more embodiments.
Figure 2B:
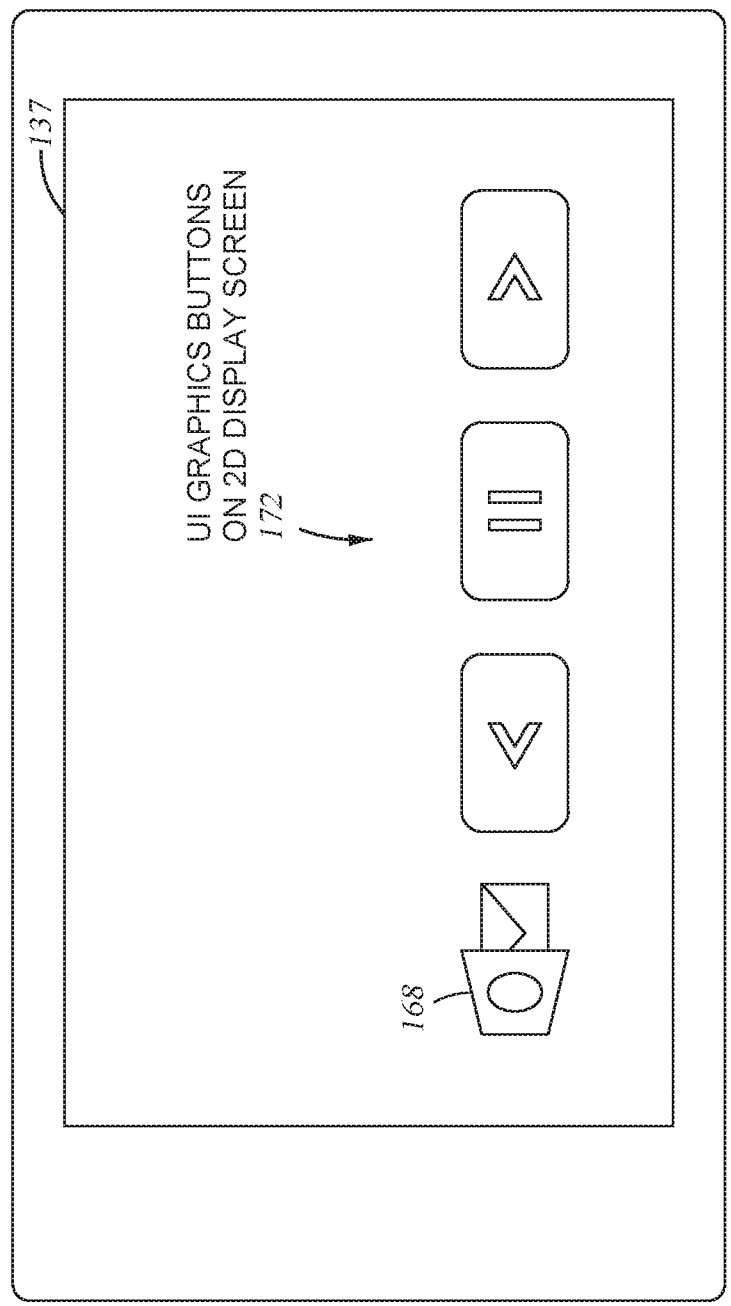

FIG. 2B illustrates a user's hand interacting with example UI graphics buttons displayed in the 3D space above an example touch screen and display device, according to one or more embodiments. As shown, there are four UI graphics 172 buttons displayed on the display 137, and the same four UI graphics 173 buttons also projected up into the air above display 137. The first graphic 168, 169 in each set is an envelope icon used to launch an email program. In one or more embodiments, by interacting with the projected set of graphics 173 with a finger 135 in space, a user may have the same interactive functionality as if he or she had physically touched the actual display screen where the icon is displayed on display 137.

FIG. 2C illustrates the situation where the user, having selected the email icon 169, is reading an actual email 176 that has now been projected into the 3D space above the example display 137, according to one or more embodiments. As shown, display 137 shows the email program icon 168, and the display version of the actual email 175 from Jim asking if the user has arrived. As noted, the email is displayed on display 137, and also projected into the 3D space above in an aerial display 176.

FIG. 2D illustrates the user, having read the projected version of the email 176 displayed as shown in FIG. 2C, now swiping in the air with his finger 135 above the display 137 so as to delete it, after having selected a "delete" icon 179 (selection not shown). The email 175 and delete icon 178 are also displayed in a "terrestrial" version as well, on the display 137, but the user need not even look at those images on display 137 to interact with the email, as shown. This illustrates a significant benefit of an aerial display mode in accordance with one or more embodiments. Thus, the user swipes his or her finger 135 from right to left, in swiping motion 177, in the space above the display 137 where the aerial display version 176 of the email is projected. As the user performs the deletion swipe 177, as shown, the letters of the email are successively erased. As shown by the text of the email 175 displayed on display 137, when the user swipes 177 on the projected aerial image 176 of the email, the ("terrestrial") text of the email 175 as displayed on the display 137 is also erased in the exact same way as is the aerially displayed version. Thus, in the versions 175 and 176 of the email, the words "Jim" and "Have you a" are not shown, having been "pushed out" towards the left by swiping motion 177.

Thus far, examples of user interaction with UI icons in an aerial display mode of an example display device have been described with reference to FIGS. 2A through 2D. Next described, with reference to FIGS. 3B and 3C, is a 3D AR mode of an example display device, according to one or more embodiments. To motivate that description, a standard AR mode is first described, with reference to FIG. 3A.

FIG. 3A illustrates an example system 300A, which may be disposed in a display device, operating in a traditional AR mode. As explained below, in a traditional AR mode a display device adds graphic images to images of real-world objects, to create an enhanced version of those real-world objects. However, this enhanced world must be viewed on a display of some kind. With reference to FIG. 3A, an example system 300A, similar to system 100 of FIG. 1, is shown. The example system 300A may be provided, for example, in an automobile, in particular in the navigation or infotainment system. The example system 300A may, for example, have an AR mode in which images of real world objects in or near the road on which the vehicle is travelling are displayed on an in-vehicle display 145 together with AR graphics 170 that add information or interpretation to the real-world images 160.

With reference to FIG. 3A, beginning at the far left of the figure, system 300A includes a camera 110 that captures raw images 161 of a real world object 160, such as, for example, a pedestrian. The raw images are fed to a central processing unit (CPU) 130 that processes the raw images 161 and adds AR graphics 170 to them. For example, as shown, the AR graphic is a label "PEDESTRIAN" provided adjacent to the image of the pedestrian. The combined image 161 with added graphics 170 is fed to TDDI circuitry 140, which causes a combined in-vehicle display/touch panel 145 to display the now augmented and processed image. Display/touch panel 145 also provides a proximity raw signal 146 whenever an object is sensed in the proximity of the display/touch panel, such as, for example a user's hand in one of several poses. Proximity raw signal 146 may be used, as described below, to alert TDDI 140 to analyze capacitive responses of such proximate objects and identify one or more of them as user commands.

Continuing with reference to FIG. 3A, underneath the schematic diagram of system 300A the in-vehicle display screen 144 of display/touch panel 145 is also shown. On in-vehicle display screen 144 the user/driver sees a displayed augmented image 162, which includes the image 161 of the pedestrian as augmented by the AR graphic 170, here the word "PEDESTRIAN" written on a rectangular field. Thus, as shown, the user may directly see the real world image of the pedestrian 160 through his windshield, and may also see, on in-vehicle display 145, the displayed augmented image 161 of the pedestrian with the identifier that says "PEDESTRIAN" 170. Thus, in the traditional AR mode, both an image of a real world object and application generated associated AR graphics are displayed together with, but only on, a 2D display screen. This forces the user to look at the 2D display 144 of display/touch panel 145 to see the augmented image 162, but then frequently shift his or her line of sight to the actual real world object 160 that is outside of the vehicle, on the actual road. This is both distracting, and uncomfortable, and possibly dangerous. In one or more embodiments, this problem is solved, as next described.

FIGS. 3B and 3C illustrate an enhanced version of the example system of FIG. 3A, according to one or more embodiments, in enabled and disabled states, respectively. With reference to FIG. 3B a system 300B is shown. System 300B is configured to operate in a 3D AR mode, in which it is configured to aerially display AR graphics respectively associated with real world objects at object co-ordinates in the 3D space above the display 145. In so doing, a user sees the AR graphic as if it were on, or adjacent to, the actual real world object. Thus, for example, a user of a cooking instruction application running on a display device that includes system 300B will see AR labels or other graphics that are displayed next to, for example, an onion he or she is chopping on a kitchen surface, where the labels or other AR graphics instruct the user where to cut the onion with a chef's knife, using what types of strokes, and how thin the slices should be. It may also provide feedback on the cut after the user has finished slicing the onion. In one or more embodiments, this display of AR graphics at the precise object co-ordinates may be generally accomplished by, for example, fixing the relative positioning of a user's eyes and the location and orientation of the display device (e.g., the user places the display device where he or she is going to use it during the application, and also stands in a location where he or she is going to use the application), and then calibrating prior to displaying the AR graphics.

In an example in-vehicle embodiment, as is shown in the example of FIG. 3B, where the positions of the driver's seat, and the positions of the display device and its camera are fixed, the object co-ordinates are somewhat easier to estimate, and all that is needed is some initial calibration to account for variations in user height and the posture they use when sitting in the driver's seat. In one or more embodiments, this may be done once, for each user of the vehicle, and need not be repeated. In one or more embodiments, engaging and disengaging the 3D AR mode is controlled by non-contact hand gestures that are sensed and interpreted by TDDI circuitry 140, as described in greater detail below. Thus, system 300B has certain enhancements over standard system 300A, shown in FIG. 3A.

Because most of the elements of system 300B are the same as those of system 300A, and unless noted as otherwise, having similar functions, they need not be described again, or only briefly described. Continuing with reference to FIG. 3B, there is the camera 110, which is used to capture a real world image 160, as described above. As was the case with system 300A, the raw images are fed to a central processing unit (CPU) 130 that both processes the raw images 160 and adds AR graphics 170, shown here as the identifier "PEDESTRIAN", which, in this example of a user being the driver of a vehicle, will be displayed, for example, on the vehicle's windshield, so as to appear to the user/driver as being at the same position—outside of the vehicle—as is the actual object, pedestrian 160, outside the vehicle. As noted above, for an in-vehicle display application, where the system has been calibrated for a given user, the application may then estimate the height at which the AR graphics are to be displayed. Part of the processing of the raw images of objects 160 by CPU 130 is to determine the co-ordinates of the objects 160 in a common 3D space 165 shared by both the objects 160 and the volume above, or in front of, as the case may be (depending upon how it is mounted), of display/touch panel 145.

Continuing with reference to FIG. 3B, the AR graphics are provided by CPU 130 to TDDI circuitry 140, which feeds them to display/touch panel 145 using a display driver. Additionally, TDDI 140 is configured to sense non-contact gestures by a user of the system that are made above the surface of display/touch panel 145. For example, these non-contact gestures may be used to preview, turn on, and turn off aerial display functionality. For the purposes of FIG. 3B, it is assumed that an example user of the system, provided for example in a vehicle, has executed a non-contact "grab" gesture followed by a non-contact "pull" gesture, and this is detected by TDDI 140 as shown at 141. These non-contact gestures, explained in detail below, respectively first put the aerial display functionality of system 300B in a preview mode, and then in a full operational mode. Once this occurs, TDDI 140 sends a signal to CPU 130, which, in turn, sends both enable signal 131 to camera 110, and enable signal 133 to a mechanical/optical switch, which is configured to project aerial images into the 3D space 165. Taken together, these enable signals 131, 133 cause the camera 110 to acquire co-ordinates in 3D space of any identified objects, and a 3D imaging equipment (not shown) controlled by mechanical/optical switch 135 to project the AR graphics 170 that are generated by CPU 130, into the 3D space 165, as shown.

Thus, as shown at the bottom right of FIG. 3B, because the AR graphics 170 are both displayed on display/touch panel 144, and also projected in an aerial display via an optical medium, such as a mechanical/optical switch, so that, as described above, a user sees, in the real world, object 160 together with its aerially displayed AR graphics 171, no image of the real world object 160 is shown on the display 144. Thus, the user/driver of the vehicle does not need to ever look at display 144 as long as system 300B is in aerial display mode. As described in detail below, in one or more embodiments, in order to turn off the aerial display functionality, the user may perform a third non-contact gesture, known, for example, as a "crush."

Although system 300B illustrates an in-vehicle example, there are many other example situations that benefit from operating a display/touch panel device in aerial display mode. These include, for example, as noted above, navigating through a cooking recipe application with messy or wet hands, or browsing through instruction steps using a carpentry application while wearing gloves, thus making it impossible to physically touch the touch panel of a display device, or, for example, performing a medical procedure or operation where one's eyes must be kept on a patient, and the physician or surgeon is also wearing gloves.

As noted above with reference to FIG. 3B, once TDDI 140 detects that a user has performed the non-contact grab and pull gestures, CPU 130 sends the enabling signals 131 and 133. Similarly, once TDDI 140 detects that a user has performed, for example, the non-contact crush gesture, CPU 130 sends disabling signals to camera 110 and mechanical/optical switch 135, and these stop performing the aerial display functionality. This is next described with reference to FIG. 3C.

FIG. 3C illustrates operation of the example system of FIG. 3B when the aerial display mode is disabled, according to one or more embodiments. The system 300B is disabled by CPU 130 sending disable signal 131 to camera 110, and similarly sending disable signal 133 to mechanical/optical switch 135. In one or more embodiments, affirmative disable signals may be sent, or, for example, the lack of enable signals being sent by CPU 130, as shown in FIG. 3B, may also operate as a "disable" signal. Thus, as shown in FIG. 3C, because 3D AR mode has been disabled the mechanical/optical switch has turned off aerial image display, and UI graphics 172 that are generated by the CPU 130 are simply displayed on touch/display 145, as shown. The user sees object 160 in his view of the 3D space 165, but he or she sees no graphics or AR enhancements in the 3D space 165. This situation occurs as long as no grab and pull user non-contact gestures have been detected, as shown at 142. If, however, the user decides to turn aerial display mode back on, then such gestures must be made, and, once detected, the example system 330B returns to its configuration as depicted in FIG. 3B.

Figure 4:
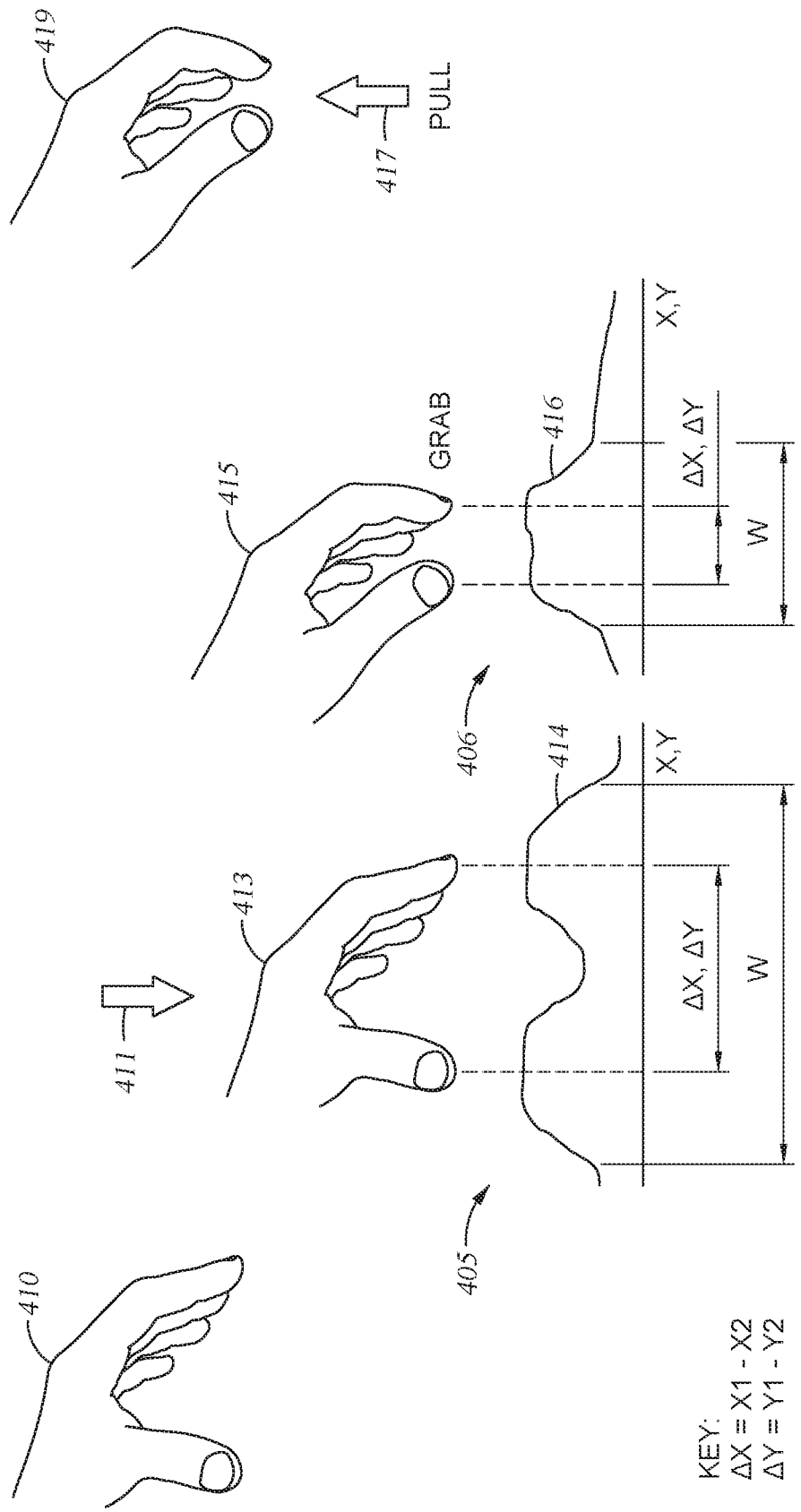
FIG. 4 illustrates example capacitive responses of positions of a user's fingers used in detecting a non-contact grab gesture by a touch screen of an example device, according to one or more embodiments.
Figure 6:
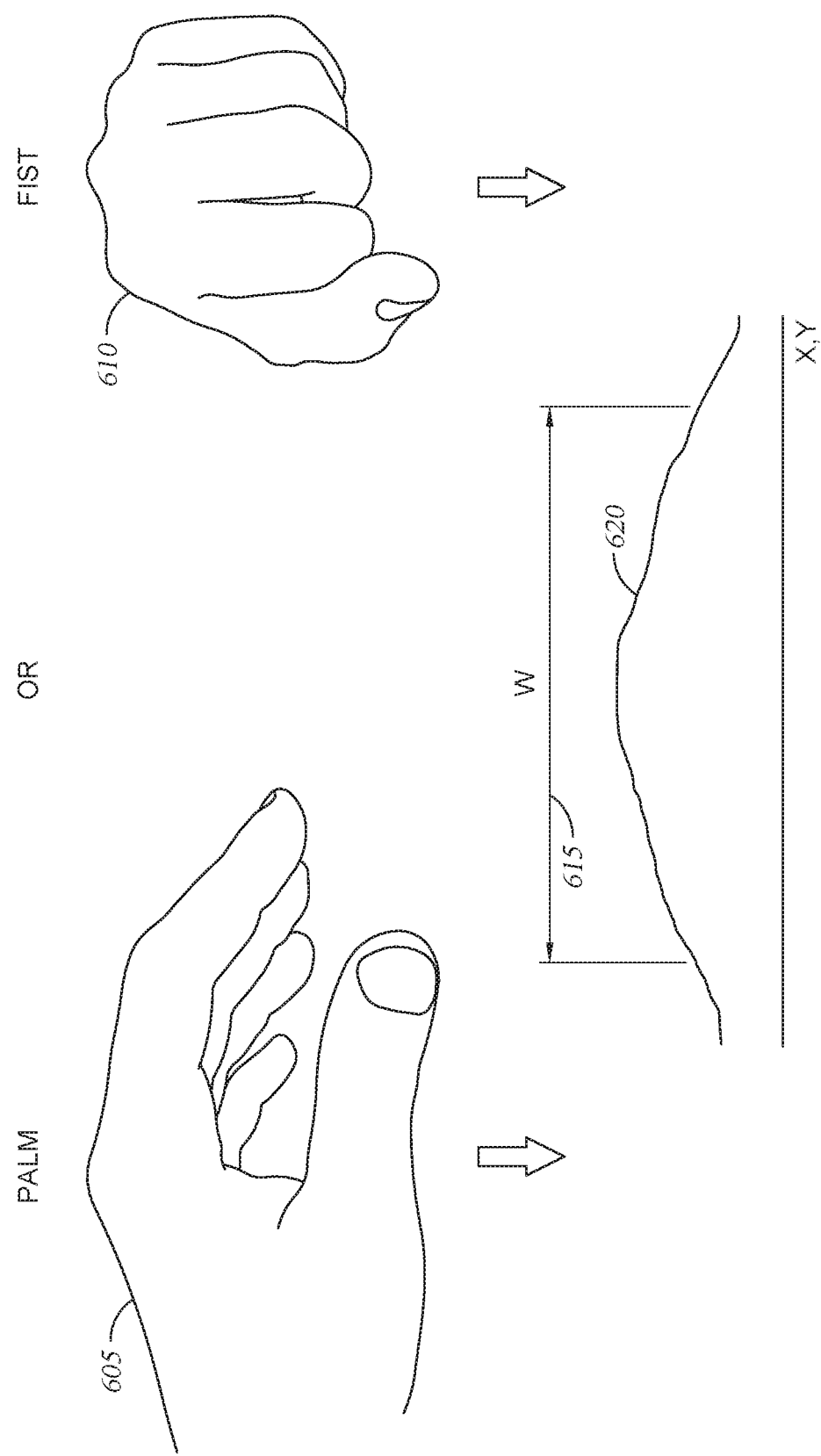
FIG. 6 illustrates a user executing a non-contact crush gesture, and a corresponding example capacitive response to the crush gesture, according to one or more embodiments.

FIG. 4 illustrates example capacitive responses of different example positions of a user's fingers that may be used in detecting a non-contact grab gesture, followed by a pull gesture, by a touch screen of an example device, according to one or more embodiments. It is understood that the non-contact gestures described in this disclosure, including those illustrated in FIGS. 4 and 6, are exemplary only, and any set of mutually discernable non-contact gestures may be mapped to a corresponding set of control commands of an example touch and display system. As noted above with reference to FIG. 3B, in some embodiments, the two-stage process of a non-contact hand gesture known as a "grab" followed by a non-contact hand gesture known as a "pull" may be used to engage an aerial display mode of an example system, by first, following a "grab" gesture, entering a preview of the aerial display mode, and then, following a subsequent "pull" executed within a pre-defined time, entering a full aerial display mode of the example system. In one or more embodiments, a capacitive proximity response is detected and processed on TDDI circuitry, for example a TDDI chip, or, in other embodiments, on a touch controller of a touch sensing equipped display device. Once the corresponding non-contact hand gesture of "grab" or "pull" has taken place, it is reported to a host which, in turn, enables a mechanical/optical switch to perform aerial display projection.

Details of exemplary "grab" and "pull" gestures, and how they are detected from their respective finger configurations and reported, is illustrated in FIG. 4 according to one or more embodiments. With reference thereto, at 410 a user's hand with multiple fingers extended from each other is first lowered down towards a touchscreen, as shown by arrow 411, ending at a height as shown at 413. The fingers may be the thumb and index finger, for example. Once the user's fingers involved in the gesture are positioned as shown at 413, the user's fingers are now sufficiently close to the touch screen to generate a capacitive response 414. As shown, the capacitive response 414 for the two fingers in configuration 413 is seen as two or more humps, each hump representing a given signal amplitude maximum, and corresponding to one of the extended fingers. In one or more embodiments, the relative peak-to-peak distance ($\Delta X$, $\Delta Y$) of the humps, their height, and/or their end to end width (W) may be stored at an initial encounter such as shown at 413, designated as $t=T0$ 405. In one or more subsequent time instances, where $t<T0+Td$ 406, for a pre-defined temporal window Td, the fingers may have the configuration shown at 415, and may have capacitive response 416. Metrics of the two capacitive responses at the two data points may then be compared, for example. If, in comparing the proximity of the peaks of the humps at both $t=T0$ and at $t=$some subsequent time$<T0+Td$ it is determined that the two humps of the capacitive response are progressively converging into the same spatial location, and ultimately either becoming a single object entity, or at least coming closer together, measured by, for example, decreasing (AX, ΔY) or W decreasing below some threshold, a grab gesture may be reported to a system host. The grab gesture indicates that the user has pinched the two or more fingers together, as in the finger configuration shown at 416.

Although only a two-dimensional (2D) cross section of the two capacitive responses 414 and 416 are shown in FIG. 4, it is understood that, in general, the peaks of the capacitive responses shown in FIG. 4 actually appear as 3D "mountains" with the peak in the center, surrounded by a set of nested ring shaped curves of lower and lower amplitude as their distance from the central peak. This is because a finger, being a 3D object hovered over a 2D sensor array has a 3D capacitive response. Thus, the actual distance between peaks in configuration 414 is $(\Delta X|_{t=T0}^2 + \Delta Y|_{t=T0}^2)^{0.5}$, and, similarly, the actual distance between peaks in configuration 416 is $(\Delta X|_{T0<t<=T0+Td}^2 + \Delta Y|_{T0<t<=T0+Td}^2)^{0.5}$, where the distance between the two peaks may be a line segment in the X-Y plane. Similarly, W as shown in FIG. 4 refers to the distance between the outer edge of one such "mountain" and the outer edge of another "mountain" of the capacitive response, along a line in the X-Y plane that runs through their respective centers.

In one or more embodiments, in response to the host receiving the grab gesture indication, it may then enable a mechanical/optical switch, such as, for example, mechanical/optical switch 135 of system 300B of FIGS. 3B and 3C, to aerially display one or more images in a preview mode. In one or more embodiments, in a preview mode of a display device images are projected into the 3D space above the display screen, but at a relatively lower height. For example, the height of the projected image above a display screen for a preview mode may be some fraction of the full height which the system is capable of projecting images at. In some embodiments, the image projected into the 3D space may be a helper, or genie, icon, as illustrated in FIG. 2A, used to guide a user in moving from the preview aerial display mode to the full aerial display mode. Once the latter occurs, the user may then interact with the actual AR or UI graphics images aerially displayed, depending upon which task or application the user has chosen.

Continuing with reference to FIG. 4, in one or more embodiments, a full aerial display mode, in which images are projected at their full height above the display screen, is enabled upon detection by, for example, a TDDI chip, or a touch controller, of a pull gesture made by a user, as long as the pull gesture is made within some pre-defined time Td following the initial grab gesture. An example pull gesture is illustrated by arrow 419, where the user, holding his or her fingers in essentially the same configuration as shown at 415, and as indicated by upwards pointing arrow 417, pulls or raises his or her fingers upwards, away from the display screen. In terms of the capacitive response plot for a pull operation, it maintains a similar peak-to-peak distance as it had at the end of the grab gesture, as the peaks do not move relative to one another. However, W will decrease during the pull gesture, because the amplitude of the capacitive response decreases across the entire response plot as the object (user's fingers) distance from the display screen increases, and thus the ends of the capacitive response plot drop to zero. Thus, in one or more embodiments, a pull gesture is detected by the gradual lowering in amplitude of the overall capacitive response while the shape of the capacitive response stays essentially the same, but its width W decreases. This two-staged action of grab and pull allows preview or confirmation of aerial projection to the user and also safeguards against any false activation, such as may be caused, for example, by a hand accidentally swinging over a display. In some embodiments, in order to perform the pull gesture, the user may pull on the icon or other image at the location where it is displayed in the preview mode, in response to the grab gesture, as shown, for example in FIG. 2A, where a user's hand 201 pulls the genie icon 232 upwards. Pulling on the projected image gives the user an easy landmark on which to execute the pull.

Figure 5:
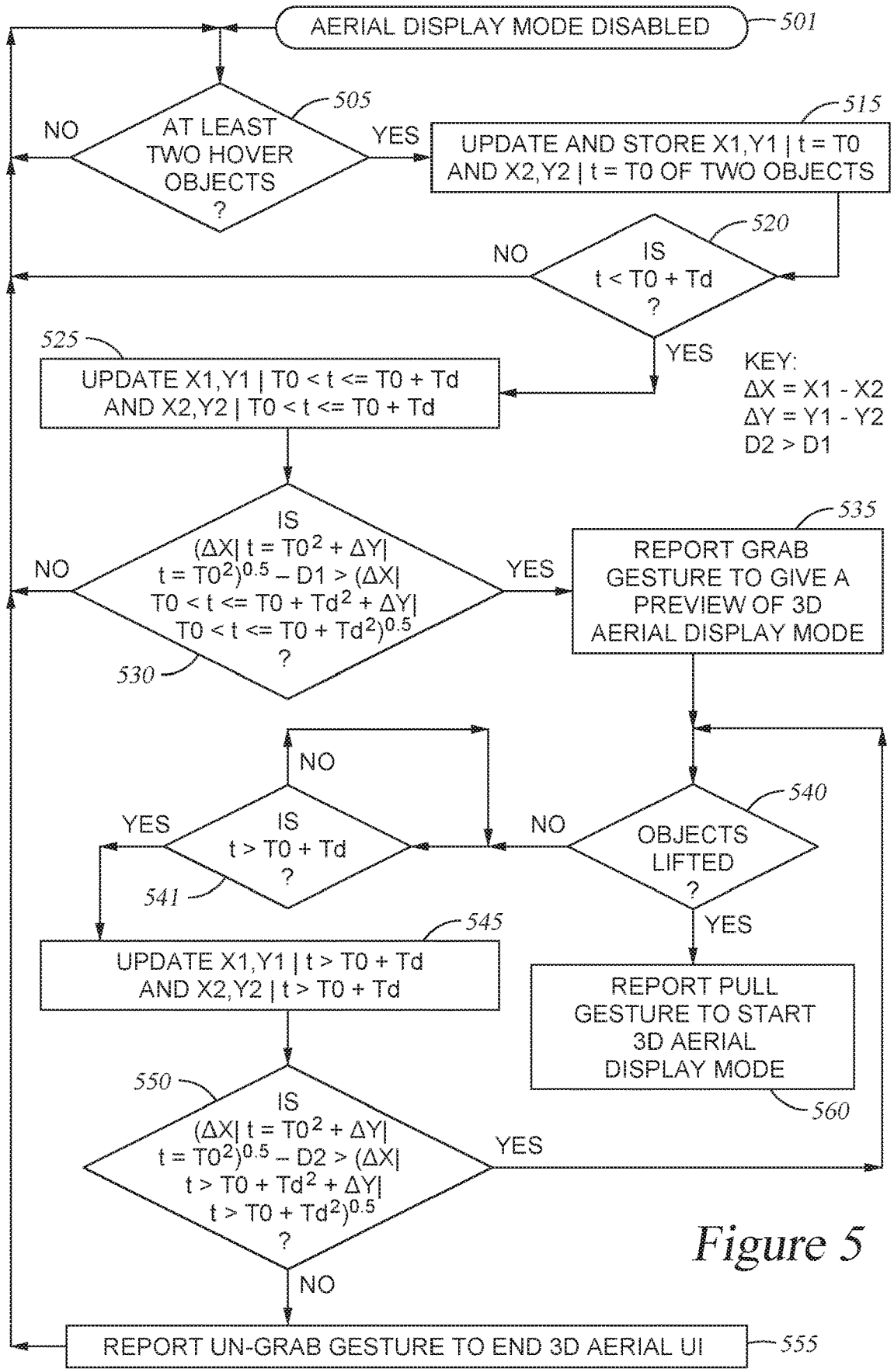
FIG. 5 is a process flow chart for an example method for detecting the non-contact grab and pull gestures that are illustrated in FIG. 4, according to one or more embodiments.

FIG. 5 is a process flow chart for an example method 500 for detecting and responding to each of the non-contact grab and pull gestures that are illustrated in FIG. 4, according to one or more embodiments. Method 500 includes blocks 501 through 560. In alternate embodiments, method 500 may have more, or fewer, blocks. Method 500 begins at block 501, where an aerial display mode of a display device is disabled. For example, this is the situation shown in FIG. 3C, described above. From block 501, method 500 proceeds to query block 505, where it is determined if at least two objects are hovering over a display screen of the display device. For example, there may be two fingers hovering over a touch screen, as shown at 413 of FIG. 4. If the response is "Yes" at query block 505, and the at least two hovering objects are detected, then method 500 proceeds to block 515, where the X and Y co-ordinates of the at least two objects, at an initial time t=T0, are updated and stored, for example X1, Y1|$_{t=T0}$ and X2, Y2|$_{t=T0}$. If, on the other hand, the response at query block 505 is "No", then method 500 returns to query block 505, and continues checking for the at least two hover objects, as shown.

From block 515, method 500 proceeds to query block 520, where it is determined if t<T0+Td. This query is essentially a time-out test, where it is determined if more time than Td has elapsed since the detection of the at least two hover objects at t=T0. If "Yes" at query block 520, then method 500 proceeds to block 525, where the Y and Y co-ordinates of the at least two objects at this second time point, where T0<t<T0+Td, are stored, for example X1, Y1|$_{T0<t<=T0+Td}$ and X2, Y2|$_{T0<t<=T0+Td}$, to be compared with the co-ordinates taken and earlier stored at block 515. If, on the other hand, the response at query block 520 is "No", then method 500 returns to query block 505, and continues to check for the at least two hover objects, as shown. For ease of illustration, it is assumed that there are only two objects, such as, for example, the two fingers shown in FIG. 4.

From block 525, method 500 proceeds to query block 530, where it is determined if the peak to peak distance of the capacitive response for the two objects has decreased by at least a first threshold D1. Thus, for example, whether:

$$(\Delta X|_{t=T0}^2 + \Delta Y|_{t=T0}^2)^{0.5} - D1 > (\Delta X|_{T0<t<=T0+Td}^2 + \Delta Y|_{T0<t<=T0+Td}^2)^{0.5},$$

or not. If a "No" is returned at query block 530, then method 500 proceeds back to query block 505, and, as noted, continues to check for the at least two hover objects. However, if a "Yes" is returned at query block 530, then the two objects have become more proximate than the threshold D1, and have done so within the time interval Td. Thus, a grab gesture has been identified, and method 500 proceeds to block 535, where the grab gesture is reported, for example, to a host computer, so that a preview of the 3D aerial display mode may be provided to the user. The preview may include, for example, projecting the image of a genie or other icon at a low height above the display screen, as noted above. In some embodiments, the genie or other icon is projected at the same height where the user's fingers are then located, as of the execution of the grab gesture.

Continuing with reference to FIG. 5, from block 535 method 500 proceeds to query block 540, where it is determined if the objects (e.g., the fingers) were lifted, to a higher elevation above the display screen. For example, in some embodiments using capacitive sensing, the maximum detection height for objects may be 5 cm above the display screen. Thus, in such embodiments, the genie icon may first be displayed at, for example 3 cm following the grab gesture, and then, if the fingers are seen to disappear, corresponding to the user raising them above the 5 cm level, a pull gesture should be triggered. Thus, if "Yes" is returned at query block 540, then method 500 proceeds to block 560, where a pull gesture is reported to the host computer, which starts the 3D aerial display mode. Method 500 then terminates at block 560.

If, on the other hand, the response at query block 540 is "No", and thus no lift gesture has yet been detected, but the user is still possibly holding the grab gesture (for example, there is still a capacitive response similar to that shown at 416 of FIG. 4), then method 500 proceeds to query block 541, to test whether sufficient time has elapsed to make a new determination. For example, in one or more embodiments the display device may wait until a new touch sensing frame has begun in order to proceed. Thus, at query block 541, it is determined if t>T0+Td. If "No", the method 500 loops back to query block 541 until the required time has in fact elapsed. If "Yes" at query block 541, then method 500 proceeds to block 545, where the X and Y co-ordinates are updated for t>T0+Td, in the same manner as described above for block 525, and method 500 proceeds to query block 550, where it is determined if the peak to peak distance between the two objects has decreased overall by at least a second threshold D2, which is greater than D1. Thus, for example, whether:

$$(\Delta X|_{t=T0}^2 + \Delta Y|_{t=T0}^2)^{0.5} - D2 > (\Delta X|_{t>T0+Td}^2 + \Delta Y|_{t>T0+Td}^2)^{0.5}$$

or not. If "Yes" is returned at query block 550, then the two objects have become even more proximate, and are now within the distance D2 of each other, so the user has not abandoned the grab gesture. Method 500 then again proceeds to query block 540 to test for the pull gesture, and if "No" then method 500 may continue looping through blocks 541, 545, 550 and 540 until either the pull is detected at query block 540, or a "No" is returned at query block 550. If the latter occurs, then the user's fingers, or whichever other objects are used, are not becoming more proximate, and method 500 proceeds to block 555, where an "un-grab" gesture is reported, meaning that the user has abandoned the grab gesture, so that the host computer may collapse the icon which had been displayed above the display screen at the preview mode height, and method 500 returns to query block 505 to once again check for a two object hover, as described above. Thus, until the "No" is obtained at query block 550 (or, of course, a "Yes" is returned at query block 540), the display device remains in a preview mode of the aerial display, and the icon or image is continually projected at the preview height. In alternate embodiments, a timer may be set, such as, for example, by implementing another query block to the left of query block 541, to test for how much time has elapsed from T0, and if, say t>T0+N*Td, where N is a pre-defined integer, to terminate method 500, even if the grab gesture has not been abandoned.

FIG. 6 illustrates a user executing an example non-contact crush gesture, and a corresponding example capacitive response to the crush gesture, according to one or more embodiments. With reference thereto, at 605 is shown a user's palm being lowered towards a display screen in an essentially horizontal pose, and similarly, at 610, a user's first is shown being lowered to the display screen, also in a horizontal pose. As noted above, the closer an object is to a touch sensing system, the higher the amplitude of a capacitive response. Thus, as shown in FIG. 6, a third type of non-contact gesture, which is distinct from both of the grab and the pull gestures illustrated in FIG. 4, may be defined, and, in one or more embodiments, this third non-contact gesture may be used to signal the display device that a user wants to terminate a 3D aerial display mode of the display device. To disambiguate from normal pointy fingertip operation that may be used to interact in aerial display mode, a palm or a first is used for the crush gesture, as each of those objects has a larger, and flatter, signal profile.

Continuing with reference to FIG. 6, both non-contact gesture options shown have the capacitive response 620, which has a width W 615. As the user's hand drops downwards, the amplitude of the capacitive response 620 increases, and, because more sensors on the touch/display screen detect the presence of the hand (and not just sensors directly below the hand), the width W of the capacitive response increases. In one or more embodiments, this increased width W, as well as an increased overall amplitude of the capacitive response, may be detected as the crush non-contact gesture. As shown in FIG. 6, in one or more embodiments W may be measured at some point above the bottom of the response plot, to avoid noise.

Although the two example poses of a user's hand 605 and 610 are shown in FIG. 6, various other poses may also be used for the crush gesture. For example, the Italian finger purse gesture, with the back of the palm facing downwards, and the fingers touching at their respective tips, sometimes done when saying "what do you want" (ma the vuoi), would also have a similar capacitive response, and could also be used, when lowered over a display screen, as the hand pose for a crush gesture.

Figure 7:
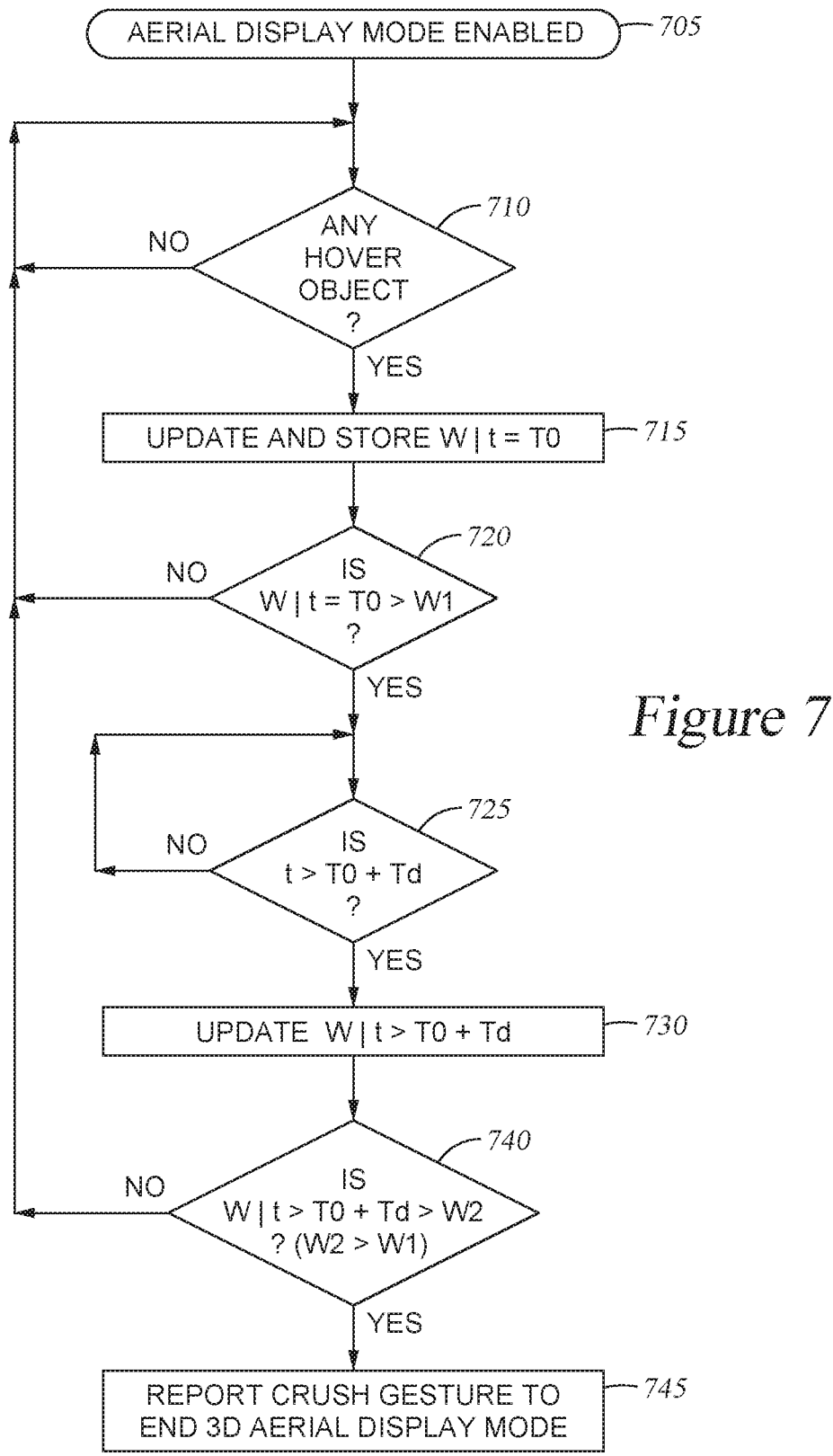
FIG. 7 is a process flow chart for an example method for detecting the non-contact crush gesture that is illustrated in FIG. 6, according to one or more embodiments.

FIG. 7 is a process flow chart for an example method 700 for detecting the non-contact crush gesture that is illustrated in FIG. 6, according to one or more embodiments. Method 700 includes blocks 705 through 745. In alternate embodiments, method 700 may have more, or fewer, blocks. Method 700 begins at block 705, where an aerial display mode has been previously enabled for a display device. Thus, FIG. 7 assumes a system as is depicted in FIG. 3B.

From block 705, method 700 proceeds to query block 710, where it is determined if an object is hovering over a display screen of the display device. For example, there may be a user's hand in either of the two poses shown in FIG. 6 hovering above the display device. If the response is "Yes" at query block 710, then method 700 proceeds to block 715, where the W of the capacitive response of the objects, at this initial time t=T0, is updated and stored. If, on the other hand, the response at query block 710 is "No", then method 700 returns to query block 710, and continually checks for the hover object, as shown.

From block 715, method 700 proceeds to query block 720, where it is determined if the detected W of the capacitive response at t=T0 meets a minimum threshold W1. The minimum threshold is to make sure that there is a sufficient capacitive response at t=T0 to use as a basis for comparison. If the user's hand is too high above the display screen, such that there is a very small amplitude and thus a W1 less than the threshold W1, the return at query block 720 will be a "No." If "Yes" is returned at query block 720, then method 700 proceeds to query block 725, where it is determined if t>T0+Td, to see if sufficient time has elapsed for the user to have performed the crush gesture. As noted above with reference to FIG. 5, Td is also a time interval sufficiently long so that the next measurement of W occurs in a new capacitive sensing frame. If "Yes" is returned at query block 725, then method 700 proceeds to block 730, where the W of the capacitive response of the object, at this second time t>T0+Td, is updated and stored. If, on the other hand, the response at query block 725 is "No", then method 700 loops back to query block 725, until such time as t>T0+Td.

From block 730, method 700 proceeds to query block 740, where it is determined if the detected W of the capacitive response at t>T0+Td is now larger than a second threshold, W2, where W2>W1. If this is so, that means the user's hand has dropped sufficiently downwards that an intent to perform the crush gesture may be inferred, and is not a normal slight movement up or down that may occur while the user really intended only to hold his or her hand at a fixed position. If "Yes" is returned at query block 740, then method 700 proceeds to block 745, where a crush gesture is reported to a host computer, and the aerial display mode ended. Method 700 then terminates. If, on the other hand, the response at query block 714 is "No", then no crush gesture has yet been performed, and method 700 returns to query block 710, and continues to check for the hover object, as shown.

Figure 8:
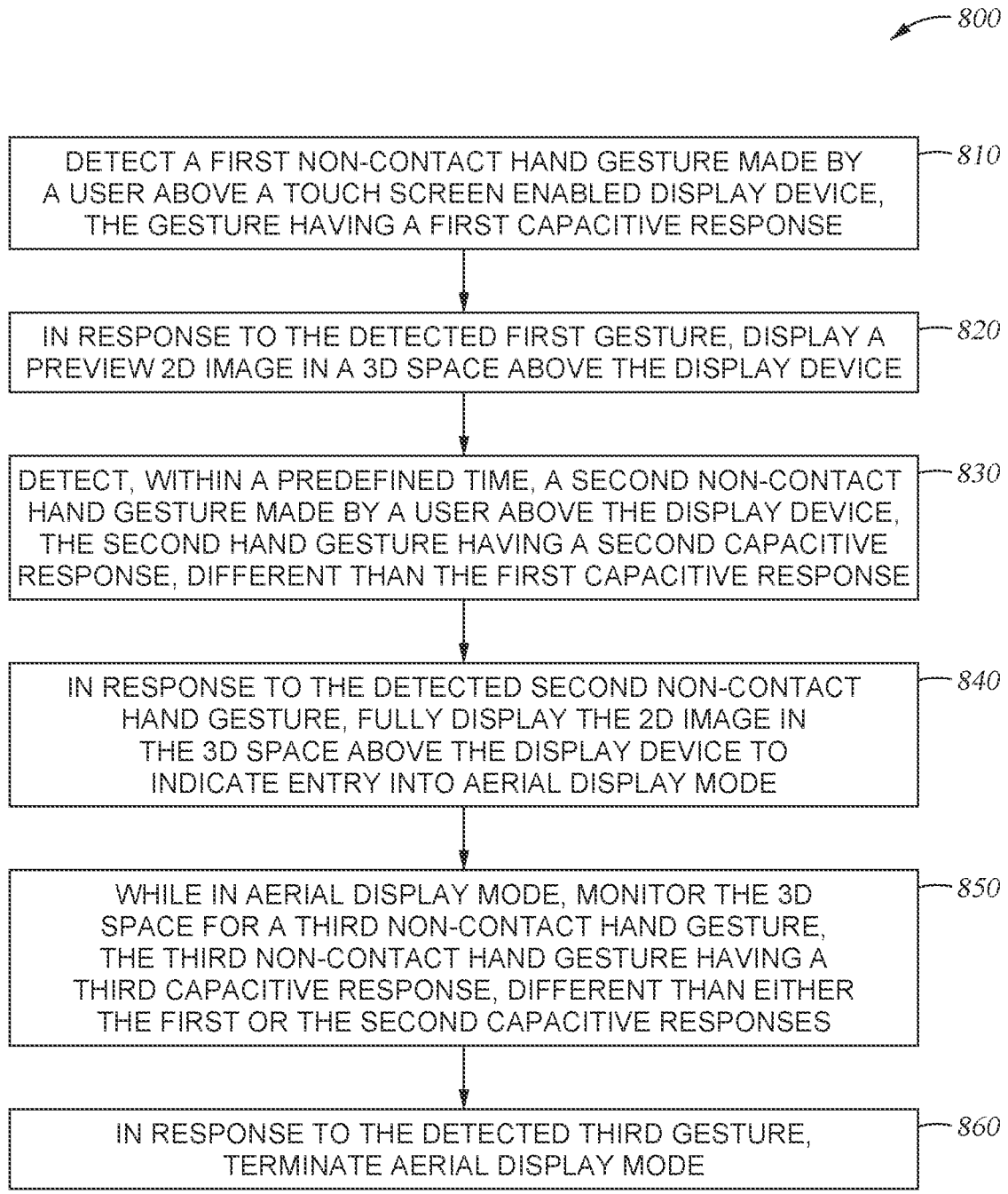
FIG. 8 is a process flow chart for an example method for responding to various user command gestures to engage and disengage a 3D AR display functionality, according to one or more embodiments.

FIG. 8 illustrates a method for responding to various user command gestures to engage and disengage an aerial display functionality, according to one or more embodiments. For example, the electronic device may be a combined display and sensing device, such as one that, for example, includes TDDI technology, as described above. For example, the display device may incorporate system 300B of FIGS. 3B and 3C.

Method 800 includes blocks 810 through 860. In alternate embodiments, method 800 may have more, or fewer, blocks. Method 800 begins at block 810, where a first non-contact hand gesture is detected above a touch screen enabled display device. For example, the gesture may be a hovering gesture as is illustrated in FIG. 2A, or, for example, a "grab" gesture 415 as is shown in FIG. 4.

From block 810, method 800 proceeds to block 820, where, in response to the detected first gesture, a preview 2D image is displayed in a 3D space above the display device. For example, the preview 2D image may be a "genie" or user helper icon 231, as is illustrated in FIG. 2A, or for example, some equivalent helper icon, it may be a set of user interface icons 173, including an email icon 169, as shown in FIG. 2B. In some embodiments, the preview 2D image may be displayed in a manner that is lesser, in some way, than a "full service" image. For example, the genie icon 231 of FIG. 2A may be projected a shorter distance above the display than it would be once the user indicates that he or she wishes to use the aerial display mode.

From block 820, method 800 proceeds to block 830, where, within a predefined time, a second non-contact hand gesture is detected above the display device, the second hand gesture having a different capacitive response than the first non-contact hand gesture. In embodiments, as noted above, the first hand gesture is used to trigger display of a preliminary, or preview image, showing the user that the aerial display functionality is available. In embodiments, when the user performs the second hand gesture, that is interpreted as a confirmation that the user wants to use the aerial display functionality of the display device. Thus, the first and second hand gestures need to be distinguished from each other by the display device, and thus, in embodiments, they have a different capacitive response from each other.

For example, the second hand gesture may be a "pull" motion performed on the displayed preview 2D image as projected into the 3D space, such as, for example, a user pulling upwards on the genie icon 231, or an equivalent helper icon, as is shown in panel 230 of FIG. 2A. The genie or helper icon, as the case may be, is used to provide the user with a visual feedback effect, in the nature of a startup screen, to inform the user that aerial display projection is enabled or disabled. Once the user fully engages the aerial display mode, then various other icons may be projected, depending up the application selected by the user.

From block 830, method 800 proceeds to block 840, where, in response to the detected second hand gesture, the image used for the preview is now fully displayed in the 3D space above the input device. For example, the genie icon 231 is now displayed at a full, higher, height than it was during the preview.

From block 840, method 800 proceeds to block 850, where, while the display device is in aerial display mode, the space above the input device is monitored for a third non-contact hand gesture, the third non-contact hand gesture having a different capacitive response than either of the first and second non-contact hand gestures. For example, the third non-contact hand gesture may be a crush gesture, as illustrated for example in FIG. 6, with one of the two example hand configurations, or other configurations with equivalent capacitive responses.

From block 850, method 800 proceeds to block 860, where, in response to detection of the third non-contact hand gesture aerial display mode of the display device is terminated, and method 800 ends. In some embodiments, upon the detection of a crush gesture, whichever icons are being projected are simply collapsed, and the user must interact with them on the display screen itself thereafter. In alternate embodiments, when a crunch gesture is detected, not only are the UI or AR, as the case may be, icons and images no longer projected upwards, the genie or helper icon may appear, and be shown as falling down, into the screen, to confirm visually to the user that the crush has occurred. In some embodiments, a "crushing" or termination sound may also be played to provide an additional audible cue to the user. In fact, in such embodiments, audible cues may be played to the user to indicate the preview mode as well as the full aerial display mode.

Figure 9:
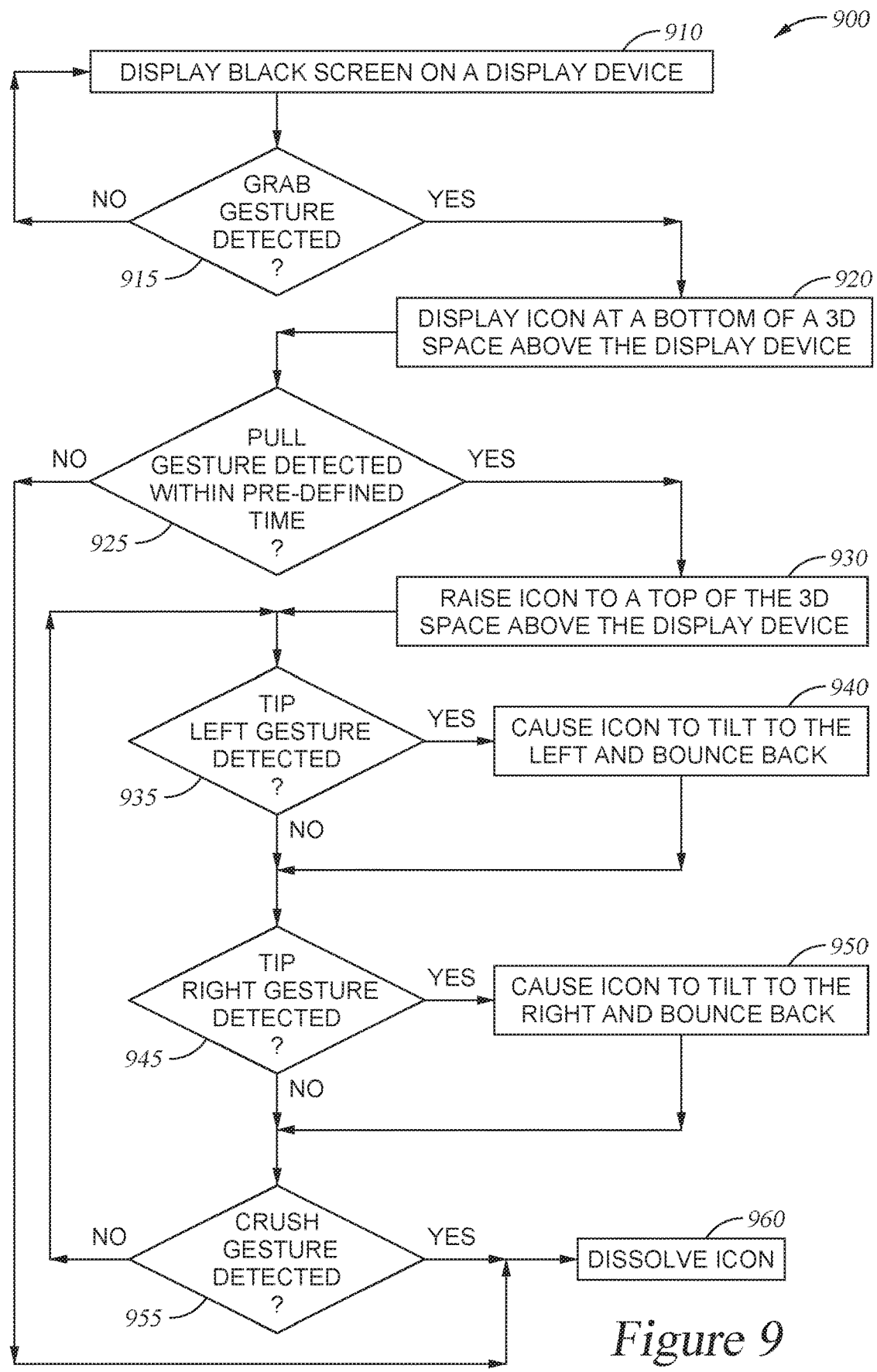
FIG. 9 is a process flow chart for an example method for interacting with aerial displayed objects, according to one or more embodiments.

FIG. 9 is a process flow chart for an example method for interacting with a user performing non-contact hand gestures, according to one or more embodiments. While the example method 800 of FIG. 8 illustrates the use of non-contact gestures to preview, enter into, and stop, an aerial display mode of a device, method 900 also provides additional non-contact gestures that may be used while in the aerial display mode, to interact with one or more applications via, for example, the same icon used to enter the aerial display mode, described above as the genie or helper icon. Thus, method 900 continually displays the icon, for example the genie or helper icon, until the display device terminates aerial display mode. Method 900 may be performed by a display device equipped with an aerial display functionality, according to one or more embodiments. For example, the electronic device may be a combined display and sensing device, such as one that, for example, includes TDDI technology, as described above. For example, the display device may include system 300B of FIG. 3B, described above.

Method 900 includes blocks 910 through 960. In alternate embodiments, method 900 may have more, or fewer, blocks. Method 900 begins at block 910, where the display device displays a black screen. From block 910 method 900 proceeds to query block 915, where it is determined if a grab gesture has been detected in the 3D space above the display device. If "Yes" is returned at query block 915, then method 900 proceeds to block 920, where an icon is displayed at a bottom of a 3D space above the display device, to indicate a preview of an aerial display mode. For example, the icon may be the genie icon 231 of FIG. 2A. If, on the other hand, the response at query block 915 is "No", then no grab gesture has been performed, and method 900 returns to block 910, and continues to display the black screen.

From block 920 method 900 proceeds to query block 925, where it is determined if, within a pre-defined time, a pull gesture has been detected in the 3D space above the display device. If "Yes" at query block 925, then method 900 proceeds to block 930, where the icon previously displayed at the bottom of the 3D space above the display device is now raised to a top portion of the 3D space, to indicate that aerial display mode has been entered. This upper position of the icon is known as its "home position." If, on the other hand, the response to query block 925 is "No", then no pull gesture has been timely performed, and method 900 proceeds to block 960, where the icon is dissolved, and method 900 terminates. Alternatively (not shown) method 900 may not terminate at block 960, but rather return to block 910, and wait for the next grab gesture.

From block 930 method 900 proceeds to query block 935, where it is determined if a "tip left" gesture has been detected. A tip left gesture is a fourth non-contact hand gesture that a user utilizes while in full aerial display mode, to control or command a function. The tip left gesture is applied by a user to the genie or helper icon used to preview and enter the aerial display mode. In one or more embodiments, the tip left gesture may be mapped to any desired functionality of any application of the display device. If "Yes" is returned at query block 935, then method 900 proceeds to block 940, where the icon is caused to tilt to the left and then bounce back to its home position, at the top portion of the 3D space. At the same time, the functionality to which tip left is mapped is executed by the display device, and method 900 proceeds to query block 945. In some embodiments, the icon only rotates, while in the home position, to indicate the tip left. In other embodiments, for example, the icon may both translate to the left as it rotates, in a more demonstrative version. Other example motions may also be performed. If, however, a "No" was returned at query block 935, then method 900 directly proceeds to query block 945, where it is determined if a "tip right" gesture has been detected. A tip right gesture is a fifth non-contact hand gesture that a user utilizes while in full aerial display mode, to control or command a function. As was the case with the tip left gesture, the tip right gesture is applied by a user to the genie or helper icon used to preview and enter the aerial display mode. In one or more embodiments, the tip right gesture may be mapped to any desired functionality of the display device.

If "Yes" at query block 945, then method 900 proceeds to block 950, where the icon is caused to tilt to the right, which, as described above for the "tilt left" response, may include a rotation, a translation, or any combination of rotation and translation of the example icon, and then bounce back to its home position, at the top portion of the 3D space. At the same time the functionality to which the tip right gesture is mapped is executed by the display device, method 900 proceeds to query block 955. If, however, a "No" was returned at query block 945, then method 900 directly proceeds to query block 955, where it is determined if a crush gesture has been detected, which a user uses to exit the aerial display mode. If "Yes" at query block 955, then method 900 proceeds to block 960, where the icon is dissolved, and method 900 terminates. Alternatively, as noted above, method 900 may not terminate at block 960, but rather return to block 910, and wait for the next grab gesture.

If, however, a "No" was returned at query block 955, and thus the user desires to continue to operate the display device in aerial display mode, then method 900 returns to query block 935, to determine if a tip left gesture has been detected. Method 900 may thus loop through blocks 93, 940, 945, 950 and 955 for as long as the user wishes to operate the display device in aerial display mode, which terminates as soon as a "Yes" is returned at query block 955.

Regarding which functions may be mapped to the "tip left" and "tip right" non-contact gestures, it is noted that in an aerial display mode, it is generally desired to keep the operations simple. Thus, in most embodiments, aerial interaction with a helper icon would not be used to compose email, for example. Thus, in one or more embodiments, the serial interactions with an icon described in method 900 may be equivalent to up/down or left/right soft keys, to allow the user to navigate through various predefined UI states. For example, at a highest level, the operations may include flipping through one application icon to another. On one level down, for example in an email application, the operations may include flipping through one email to another. Or, for example, in a music player application, the operations may include changing from one song to another, or even raising or lowering a volume.

In connection with the example method 900 of FIG. 9, the example ordering of the various blocks, and which blocks are included, is understood to be only exemplary. In other example embodiments of the disclosed method, the order of any of the blocks may be changed from that as shown in FIG. 9, blocks may be performed in parallel, and some blocks not included. Thus, for example, the use of a gesture to initially enter a preview of the aerial display mode is optional, and may be omitted. Thus, a single gesture, such as, for example, either grab or pull, or other gestures, may be interpreted as a command to directly enter aerial display mode, with no prior preview mode required. Additionally, for example, the tip left, tip right and aerial display termination gestures may each be detected in a different order, or in parallel, so that the method need not complete a loop such as through blocks 935, 945 and 955 as shown in FIG. 9 prior to checking again for the tip left gesture, for example, as shown at query block 935.

In one or more embodiments, a given display device including an exemplary system may be handheld, disposed in a vehicle, disposed in a public kiosk, used in a private kitchen, or the like. Moreover, applications used in connection with the non-contact gestures may be AR applications, or may not be, as long as aerial display projection of images generated by the application is involved, such as, for example, basic controls of a computer, such as shown in FIGS. 2C and 2D, described above.

In one or more embodiments, the non-contact gestures may vary from the examples described above. For example, instead of a grab gesture, a "scoop" gesture may be used, which also seems very intuitive to users. In such embodiments, the scoop response needs to be precisely defined, so as to disambiguate from other more common gestures such as swiping, for example. Conditions to register such alternate gestures may vary and may employ additional temporal/spatial hysteresis, for example. Thus, for example, in switching from ordinary 2D display mode to 3D aerial display mode, as described above, the switching criteria may not be a clear-cut "one point" threshold. For example, taking the crush gesture as an example, it first needs to pass a "W1" test before a "W2" test may even be applied. In other words, there is no need to even test for the crush having been performed if the user's hand is too far from the display screen to have a good basis W1 for comparison with a larger W2. As another example, as described with reference to FIG. 5, the grab and un-grab gestures have different distance thresholds "D1" and "D2", making the two gestures non-commutative.

It is noted that although any gestures may be used to initiate or terminate the 3D aerial display mode, it may be advantageous to use gestures that satisfy certain criteria to prevent inadvertent triggering of mode change. For example, a simple enough hand motion that a user feels comfortable performing and easy to remember, a hand motion that requires minimum signal strength to be detected, a set of gestures each having a capacitive response that can be clearly distinguished from each other, or gestures having other suitable criteria may be used.

In alternate embodiments, in conjunction with capacitive sensing, a second camera, one or more IR sensors, ultrasonic sensors, and/or other types of sensors may be used to detect or initiate the detection of the disclosed non-contact gestures. However, it is noted, this may require both increased processing power and increased hardware size, with associated costs.

The embodiments and examples set forth herein were presented in order to best explain the embodiments in accordance with the present technology and its particular application and to thereby enable those skilled in the art to make and use the disclosure. However, those skilled in the art will recognize that the foregoing description and examples have been presented for the purposes of illustration and example only. The description as set forth is not intended to be exhaustive or to limit the disclosure to the precise form disclosed.

In view of the foregoing, the scope of the present disclosure is determined by the claims that follow.

What is claimed is:

1. A method for displaying aerial images, comprising:
   detecting a first capacitive response of a first non-contact gesture made by a user proximate to a touch sensing enabled display screen;
   in response to detecting the first non-contact gesture, displaying an icon at a first distance from the display screen in a three-dimensional (3D) space proximate to the display screen;
   detecting a second capacitive response of a second non-contact gesture made by a user proximate to the display screen;
   in response to detecting the second non-contact gesture, displaying one or more icons, one or more graphics and/or one or more other images at a second distance from the display screen in the 3D space proximate to the display screen, wherein the second distance is different from the first distance;
   detecting a third capacitive response of a third non-contact gesture made by a user proximate to the display screen; and
   in response to detecting the third non-contact gesture, ceasing to display the one or more icons, the one or more graphics and/or the one or more other images.

2. The method of claim 1, wherein the displaying the icon at the first distance from the display screen corresponds to displaying a preview version of the icon in the 3D space proximate to the display screen.

3. The method of claim 2, wherein the detecting the first capacitive response of the first non-contact gesture comprises:
   detecting two objects hovering above the display screen; and
   detecting a decrease in a distance between the two detected objects within a pre-defined time.

4. The method of claim 2, wherein the first non-contact gesture is a grab and the second non-contact gesture is a pull.

5. The method of claim 4, wherein the second non-contact gesture is detected based on the second capacitive response reflecting a decrease in amplitude.

6. A system for aerial display of images, comprising:
   a display screen including 3D imaging equipment;
   a touch screen sensing system; configured to obtain capacitive responses corresponding to respective non-contact gestures made by a user proximate to the display screen, wherein the non-contact gestures include a first non-contact gesture, a second non-contact gesture, and a third non-contact gesture; and
   a processor coupled to each of the display screen and the touch screen sensing system, wherein the processor is configured to control the 3D imaging equipment to display one or more images in a 3D space proximate to the display screen in response to the obtained capacitive responses corresponding to the respective non-contact gestures, including:
      displaying an icon at a first distance from the display screen in response to the first non-contact gesture;
      displaying one or more icons, one or more graphics and/or one or more other images at a second distance from the display screen in response to the second non-contact gesture, wherein the second distance is different from the first distance; and
      ceasing to display the one or more icons, the one or more graphics and/or the one or more other images in response to the third non-contact gesture.

7. The system of claim 6, further comprising:
   a camera configured to acquire real-time images that are proximate to the display screen.

8. The system of claim 7, wherein the camera is coupled to the processor, and the processor is further configured to, in an aerial display mode:
   generate one or more augmented reality (AR) images; and
   control the 3D imaging equipment to display at least one of the generated one or more AR images together with a corresponding real-time image.

9. The system of claim 7, wherein the touch screen sensing system includes a touch sensing electrode array and an integrated circuit configured to generate sensing signals and receive resulting signals.

10. The system of claim 6, wherein the first non-contact gesture corresponds to a grab, the second non-contact gesture corresponds to a pull, and the third non-contact gesture corresponds to a crush.

11. The system of claim 10, wherein the first non-contact gesture corresponds to entry into a preview mode of the aerial display mode, wherein the second non-contact gesture corresponds to entry into the aerial display mode, and wherein the third non-contact gesture corresponds to exit from the aerial display mode.

12. The system of claim 6, wherein the icon is a helper icon or an interactive user interface button.

13. A method of interactively displaying images in a 3D space proximate to a display device, comprising:
- displaying a graphic and/or text at a pre-defined home position in the 3D space proximate to the display device;
- determining, by analyzing a first capacitive response on the display device, that a first interactive non-contact gesture has been performed on the graphic and/or text at the pre-defined home position by a user;
- in response to determining that the first interactive non-contact gesture has been performed on the graphic and/or text by the user, displaying movement of the graphic and/or text to a second position in the 3D space and then return of the graphic and/or text to the pre-defined home position after a pre-defined time, wherein the pre-defined home position is different from the second position;
- determining, by analyzing a second capacitive response on the display device, that a second interactive non-contact gesture has been performed on the graphic and/or text at the pre-defined home position by the user; and
- in response to determining that the second interactive non-contact gesture has been performed by the user, displaying movement of the graphic and/or text to a third position in the 3D space and then return of the graphic and/or text to the pre-defined home position after the pre-defined time, wherein the pre-defined home position is different from the third position.

14. The method of claim 13, wherein each of the first interactive non-contact gesture and the second interactive non-contact gesture are mapped to respective commands of an application running on the display device.

15. The method of claim 13, wherein the first interactive non-contact gesture is a tip right gesture, and in response to the first interactive non-contact gesture, the graphic and/or text is displayed so as to tilt to the right and return the graphic and/or text to the pre-defined home position after the pre-defined time; and
- wherein the second interactive non-contact gesture is a tip left gesture, and in response to the second interactive non-contact gesture, the graphic and/or text is displayed so as to tilt to the left and return the graphic and/or text to the pre-defined home position after the pre-defined time.

16. The method of claim 13, further comprising:
- determining, by analyzing a third capacitive response on the display device, that a termination non-contact gesture has been performed by the user in the 3D space; and
- in response to determining that the termination non-contact gesture has been performed by the user in the 3D space, ceasing to display the graphic and/or text.

* * * * *

UNITED STATES PATENT AND TRADEMARK OFFICE
CERTIFICATE OF CORRECTION

PATENT NO. : 11,256,413 B2  Page 1 of 1
APPLICATION NO. : 16/786486
DATED : February 22, 2022
INVENTOR(S) : Tetsuo Tanemura et al.

It is certified that error appears in the above-identified patent and that said Letters Patent is hereby corrected as shown below:

In the Claims

Column 22, Line 22, delete:
"a touch screen sensing system; configured to obtain"
And please add:
--a touch screen sensing system configured to obtain--

Signed and Sealed this
Twenty-ninth Day of March, 2022

Drew Hirshfeld
*Performing the Functions and Duties of the*
*Under Secretary of Commerce for Intellectual Property and*
*Director of the United States Patent and Trademark Office*